US006925618B1

(12) United States Patent
Teig et al.

(10) Patent No.: US 6,925,618 B1
(45) Date of Patent: Aug. 2, 2005

(54) METHOD AND APPARATUS FOR PERFORMING EXTRACTION ON AN INTEGRATED CIRCUIT DESIGN WITH SUPPORT VECTOR MACHINES

(75) Inventors: Steven Teig, Menlo Park, CA (US); Arindam Chatterjee, San Carlos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 131 days.

(21) Appl. No.: 10/334,664

(22) Filed: Dec. 31, 2002

Related U.S. Application Data

(63) Continuation-in-part of application No. 10/062,264, filed on Jan. 31, 2002.

(51) Int. Cl.[7] .............................................. G06F 17/50
(52) U.S. Cl. ...................... 716/5; 716/4; 716/6; 716/1
(58) Field of Search ................................ 716/5, 4, 6, 1

(56) References Cited

U.S. PATENT DOCUMENTS 5,901,063 A * 5/1999 Chang et al. ................... 716/4
5,903,469 A * 5/1999 Ho ................................. 716/5

OTHER PUBLICATIONS

Li et al., "Pre-extracting Support Vectors for Support Vector Machine", Aug. 2000, IEEE Proceedings of 5th International Conference on Signal Processing, vol. 3, pp. 1432–1435.*

Ruping, "Incremental Learning with Support Vector Machines", Dec. 2001, IEEE Proceedings of International Conference on Data Mining, pp. 641–642.*

\* cited by examiner

*Primary Examiner*—Vuthe Siek
*Assistant Examiner*—Sun James Lin
(74) *Attorney, Agent, or Firm*—Stattler Johansen & Adeli LLP

(57) ABSTRACT

The present invention introduces novel methods of performing integrated circuit layout extraction. In the system of the present invention, a complex extraction problem is first broken down into a set of smaller extraction sub problems. Some of the smaller extraction sub problems may be handled by simple parametric models. However, for the frequent complex extraction sub problems, machine learning is used to build models. Specifically, Support Vector Machines are constructed to extract the desired electrical characteristics. To build the Support Vector Machines, Experimental design is employed to select a set of training points that provide the best information. In one embodiment, the training point set is created by creating a critical input spanning set, adding training points from critical regions in the input space, and adding training points from frequently encountered profile cases. The training point set is then used to train the Support Vector Machine that will extract electrical characteristics for the extraction sub problem.

20 Claims, 35 Drawing Sheets

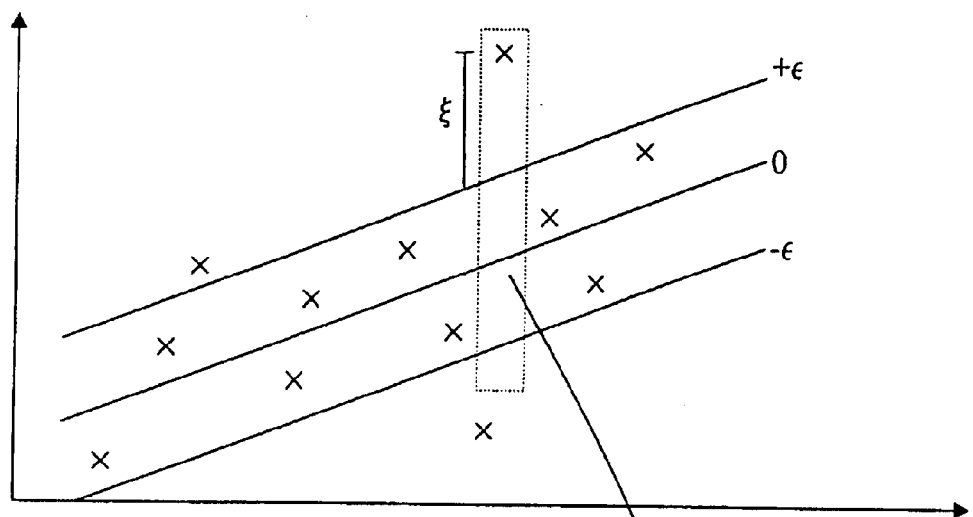
Figure 4
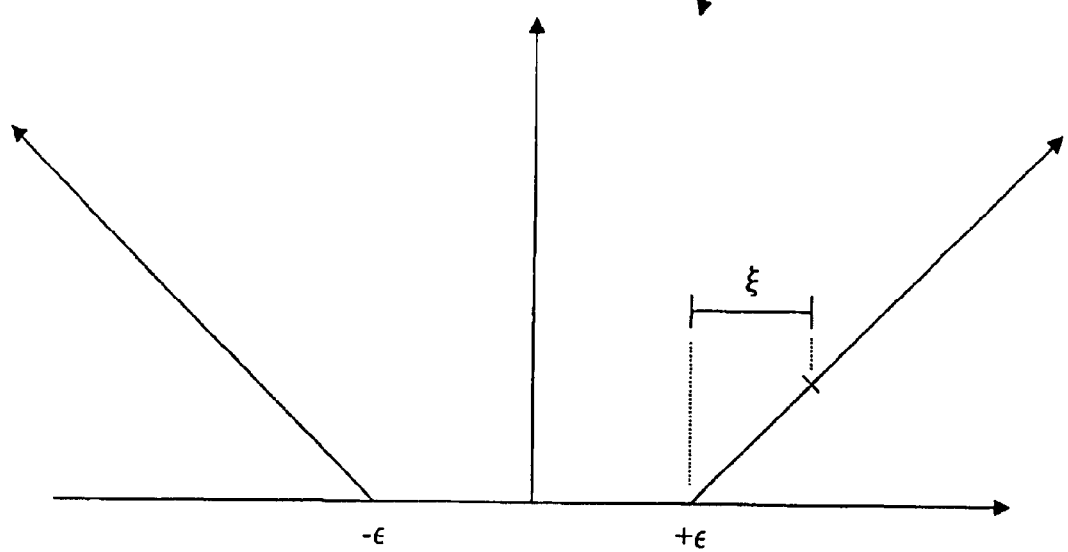

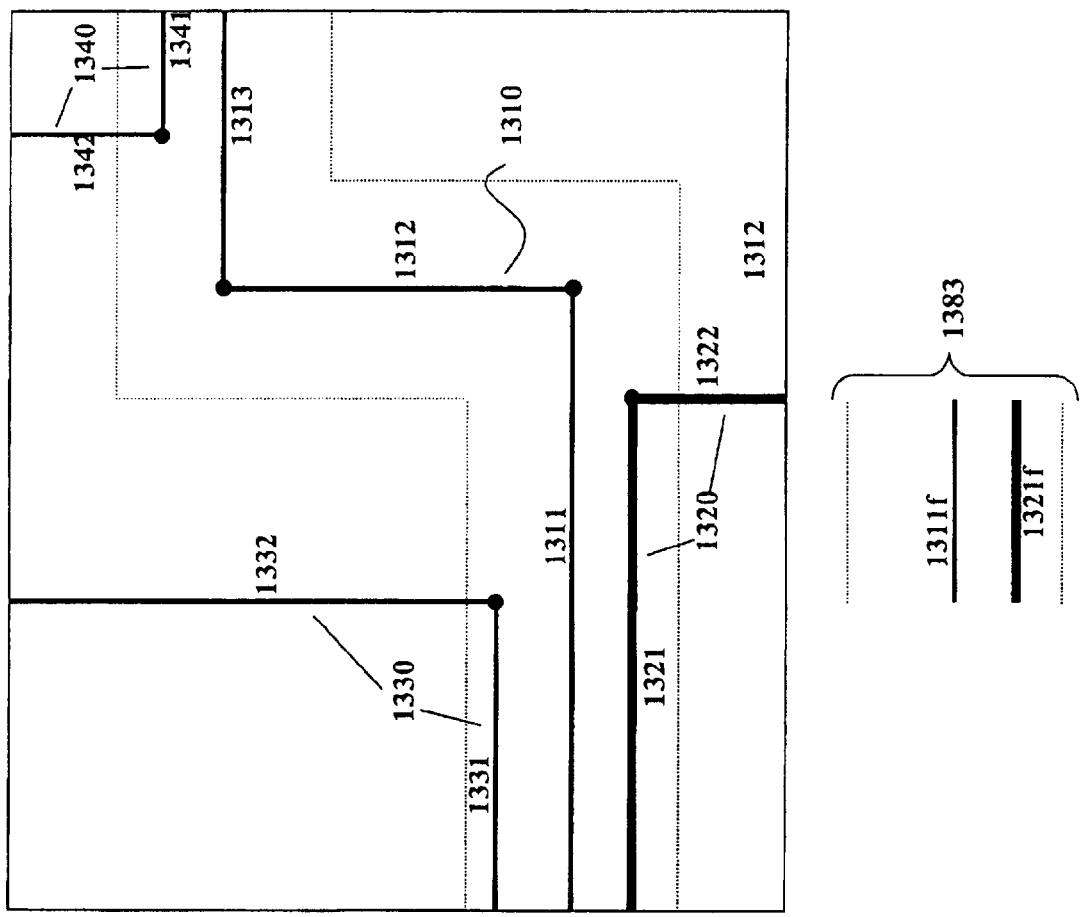

METHOD AND APPARATUS FOR PERFORMING EXTRACTION ON AN INTEGRATED CIRCUIT DESIGN WITH SUPPORT VECTOR MACHINES

RELATED APPLICATIONS

The present patent application is a continuation in-part of the U.S. patent application entitled "Method and Apparatus for Performing Extraction Using Machine Learning" filed on Jan. 31, 2002 having Ser. No. 10/062,264.

FIELD OF THE INVENTION

The present invention relates to the field of semiconductor design, semiconductor design testing, and semiconductor manufacture. In particular the present invention discloses methods for performing extraction in order to estimate various electrical and physical properties of semiconductor integrated circuit designs.

BACKGROUND OF THE INVENTION

Complex digital integrated circuits ("ICs") are initially designed using high-level logic elements such as adders, arithmetic/logic units (ALUs), memory units, buses, etc. These high level elements are in turn constructed from lower level components such as AND gates, OR gates, inverters, etc. These lower level components are constructed from basic electronic components such as transistors, diodes, and electrical conductive traces. All of these electronic and circuit components of ICs are jointly referred to as "components."

Design engineers design an integrated circuit by transforming a circuit description of the integrated circuit into geometric descriptions of physical components that create the basic electronic components. The detailed geometric descriptions of physical components are referred to as integrated circuit layouts.

To create the integrated circuit layout for a complex integrated circuit, circuit design engineers use a suite of Electronic Design Automation ("EDA") application programs. These EDA application programs are computer-based tools for creating, editing, testing, and analyzing integrated circuit design layouts.

An integrated circuit designer uses a set of layout EDA application programs to create a physical integrated circuit design layout from a logical circuit design. The layout EDA application uses geometric shapes of different materials to create the various electrical components on an integrated circuit. For instance, EDA tools commonly use rectangular lines to represent the passive wire segments (conductors) that interconnect the active integrated circuit components such as transistors. These EDA tools also represent electronic and circuit IC components as geometric objects with varying shapes and sizes.

After an integrated circuit designer has created an initial integrated circuit layout, the integrated circuit designer then tests and optimizes the integrated circuit layout using a set of EDA testing and analysis tools. Common testing and optimization steps include extraction, verification, and compaction. The steps of extraction and verification are performed to ensure that the integrated circuit layout will perform as desired. The test of extraction is the process of analyzing the geometric layout and material composition of an integrated circuit layout in order to "extract" the electrical characteristics of the designed integrated circuit layout. The step of verification uses the extracted electrical characteristics to analyze the circuit design using circuit analysis tools.

Common electrical characteristics that are extracted from an integrated circuit layout include capacitance and resistance of the various "nets" (electrical interconnects) in the integrated circuit. These electrical characteristics are sometimes referred to as "parasitic" since these are electrical characteristics are not intended by the designer but result from the underlying physics of the integrated circuit design.

For example, when an integrated circuit designer wishes to connect two different locations of an integrated circuit with an electrical conductor, the electrical circuit designer would ideally like perfect conductor with zero resistance and zero capacitance. However, the geometry of a real conductor, its material composition, and its interaction with other nearby circuit elements will create some parasitic resistance and parasitic capacitance. The parasitic resistance and parasitic capacitance affect the operation of the designed integrated circuit. Thus, the effect of the parasitic resistance and parasitic capacitance on the electrical interconnect must be considered.

To test an integrated circuit layout, the integrated circuit designer 'extracts' parasitic resistance and parasitic capacitance from the integrated circuit layout using an extraction application program. Then, the integrated circuit designer analyzes and possibly simulates the integrated circuit using the extracted parasitic resistance and parasitic capacitance information. If the parasitic resistance or parasitic capacitance causes undesired operation of the integrated circuit, then the layout of the integrated circuit must be changed to correct the undesired operation. Furthermore, minimizing the amount of parasitic resistance and parasitic capacitance can optimize the performance of the integrated circuit by reducing power consumption or increasing the operating speed of the integrated circuit.

Extracting the electrical characteristics of the integrated circuit layout (such as capacitance, resistance, and inductance) is an extremely difficult task. Most existing extraction systems approximate sections of an integrated circuit with similar geometric configurations having known electrical characteristics. Interpolation between various different similar geometric configurations is used to further refine extracted electrical characteristics.

These existing extraction techniques have been adequate but are increasingly becoming problematic as the feature size of the electrical components on integrated circuits grow ever smaller. With the very small feature size of current and upcoming semiconductor processes, the accurate extraction of electrical characteristics from integrated circuit layouts becomes critical. Thus, it would be desirable to implement new integrated circuit extraction methods that are both accurate and fast.

SUMMARY OF THE INVENTION

The present invention introduces novel methods of performing integrated circuit layout extraction. In the system of the present invention, a complex extraction problem is first broken down into a set of smaller extraction sub problems. Some of the smaller extraction sub problems may be handled by simple parametric models. For example, extracting the resistance from a straight section of interconnect wire may be performed by multiplying a known resistance per unit length by the length of the straight section of interconnect wire.

For more complex extraction sub problems, machine learning is used to build models. In one embodiment, Support Vector Machines are constructed to extract the desired electrical characteristics. To build the Support Vector Machines, Experimental design is employed to select a set of training points that provide the best information. In one embodiment, the training point set is created by creating a critical input spanning set, adding training points from critical regions in the input space, and adding training points from frequently encountered profile cases. The training point set then used to train the Support Vector Machine that will extract electrical characteristics for the extraction sub problem.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 4 graphically illustrates a linear support vector machine used for regression.

FIG. 13F illustrates the calculation of the capacitance for a third horizontal section of critical net 1310.

DETAILED DESCRIPTION OF THE PREFERRED EMBODIMENT

Figure 1:
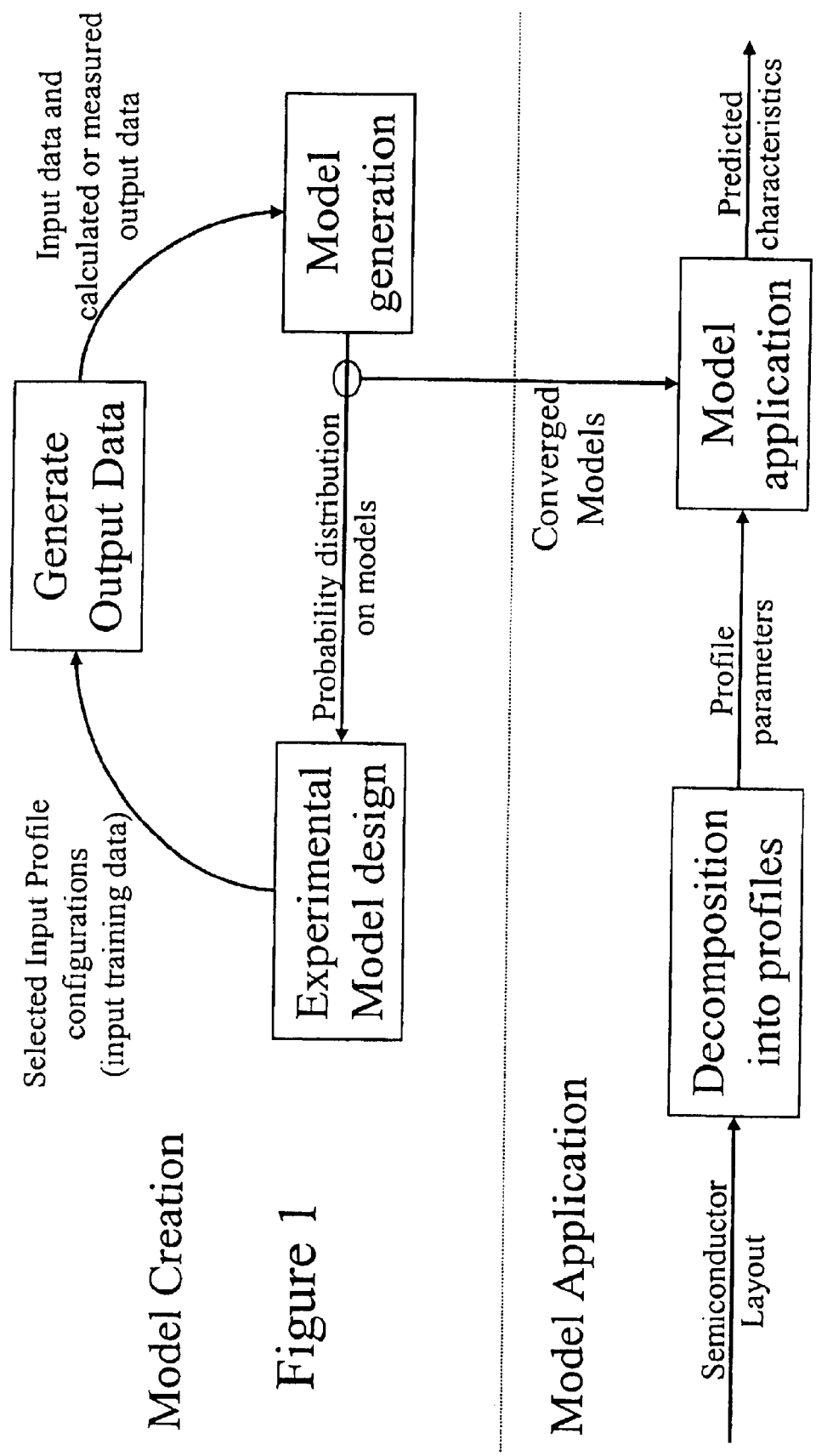
FIG. 1 illustrates a conceptual diagram that describes the overall flow of a system implemented using the present invention.

Methods for extracting electrical characteristics from integrated circuit layouts using probabilistic models are disclosed. In the following description, for purposes of explanation, specific nomenclature is set forth to provide a thorough understanding of the present invention. However, it will be apparent to one skilled in the art that these specific details are not required in order to practice the present invention. For example, the present invention has primarily been described with reference to Support Vector Machines (SVM). However, the same techniques can easily be applied using other types of machine learning systems.

Electrical Characteristic Extraction

Various different methods are used to extract electrical characteristics from an integrated circuit layout. Each of the various different methods has their own advantages and disadvantages.

Field Solvers

To extract a set of highly accurate electrical characteristics from an integrated circuit layout, an EDA extraction application program may apply field solvers. Field solvers discretize the integrated circuit layout and accurately model the physical phenomena of the integrated circuit components using the known laws of physics. The final output from a field solver is a highly accurate determination of the electrical characteristics of an analyzed integrated circuit component.

Although field solvers are very accurate, is impractical to use field solvers to extract the electrical characteristics from an entire integrated circuit layout. Specifically, field solvers are extremely computationally intensive since millions of data points must be processed. Thus, any attempt to use field solvers to extract the electrical characteristics from an entire integrated circuit layout would take an unacceptable amount of time.

Since field solvers are very accurate but painstakingly slow, field solvers are generally only used to solve small test cases or critical nets in an integrated circuit layout. Other means must be used to extract the electrical characteristics from the remainder of an integrated circuit.

Simple Formulas and Pre-calculated Tables

Since field solvers are impractical to perform extraction on an entire integrated circuit layout, most extraction systems greatly simplify the extraction problem such that extensive use of a field solver is not required. First, the integrated circuit layout is divided into small pieces wherein each small piece contains a recognized primitive geometric pattern. Then, the extraction system extracts electrical characteristics from the recognized primitive geometric pattern by applying a simplified formula or using pre-calculated table for such a primitive geometric pattern.

For example, an interconnect net may be divided into simple rectangular interconnect line sections (as seen from above). Using a width of a straight interconnect line section and the height of the interconnect line (the metal layer thickness), a cross section shape and size of the straight interconnect line section can be determined. Using shape and size of the interconnect line cross-section and its material composition, a simple resistance per unit length value may be determined. Finally, a resistance value for the straight interconnect line section may be extracted by multiplying the resistance per unit length value (determined from the shape, size, and material composition of the interconnect line cross section) by the length of the interconnect line section. Thus, a simplified formula can be used to extract some electrical characteristics from an integrated circuit layout.

Similarly, pre-calculated tables may also be used to simplify and speed up the extraction of electrical characteristics from an integrated circuit layout. For example, to extract the capacitance from an interconnect net, the length of an interconnect net may first be divided into different sections wherein each section has unvarying surrounding features. Then, the known surrounding conditions for each different section are used to identify an appropriate pre-calculated table that will be used to extract the capacitance per unit length of that section. The pre-calculated capacitance tables are constructed by using a field solver for the various different surrounding condition primitives.

For example, in one section of an interconnect net, an interconnect line may pass over a ground plane. A pre-calculated table may specify the capacitance of an interconnect wire passing over a ground plane for varying distances between the interconnect line and the ground plane and for varying widths of interconnect lines. Thus, the capacitance of such a section may be extracted by selecting the proper table value using the distance between the interconnect line and the ground plane and the width of interconnect line. If the pre-calculated table does not contain an exact matching entry, then a value may be interpolated from the closest matching entries that do exist in the pre-calculated table.

Both the application of simplified formulas and pre-calculated table improve the speed of the extraction process. However, both systems achieve that increased speed by greatly sacrificing the accuracy of the extracted electrical characteristics. With the increasingly dense integrated circuits, the accuracy of extraction systems becomes very important. Specifically, as the transistors decrease in size, the transistor delay time decreases such that the effects of interconnect wire delay increases. For long interconnect wire routes, over 50% of the signal delay may be cause by interconnect wire delay. Thus, the importance of obtaining accurate electrical characteristics of integrated circuit designs has greatly increased.

Since integrated circuit process technology continues to improve and thus allows for even denser circuitry, there is an ever-increasing need for more accurate extraction systems that can fully analyze a full integrated circuit design in a reasonable amount of time. Thus, it would be highly desirable to implement a fast yet more accurate system for performing electrical characteristic extraction.

Electrical Characteristic Extraction Using Machine Learning

To improve the state of electrical characteristic extraction system technology, the present invention introduces the application of machine learning techniques to electrical characteristic extraction problem. Using machine-learning techniques, the system of the present invention automatically builds complex models of physical phenomena from a set of training data.

The system of the present invention begins by generating initial models using a first set of trading data comprised of input points that describe various physical circuits and the electrical characteristics of those input physical circuits (the output data). Experimental design techniques are then applied to the initial models to refine those models by selecting additional training data points that provide the most information. Feedback between the model generation and experimental design force the system of the present invention to converge toward a highly predictive model.

To create a training point, a set of physical dimension input parameters is first defined. For example, to generate an input test point for a capacitance extraction system, a set of interconnect line dimensions and interconnect line spacing dimensions are defined. Then a field solver is used to determine an associated set of output points. The electromagnetic field solver then outputs a set of capacitance effect values for each interconnect line near the examined interconnect line.

The set of training data is known as D. Thus, the machine learning problem can be stated as what is the best vector function $Y=F(X)$ that maps an input. vector X to an output vector Y when provided with a set of known correct training data vectors $D=\{(X_i, Y_i): i=1 \text{ to } n\}$. In the context of a capacitance extraction system, an input vector X will consist of the interconnect line dimensions, interconnect line spacing dimensions, layer spacing dimensions, and any other relevant information needed to determine the capacitance of a particular interconnect line arrangement. The output vector Y in a capacitance extraction system will be the various capacitance values for the interconnect line arrangement.

FIG. 1 illustrates a conceptual diagram that describes the overall flow of a system implemented using the present invention. FIG. 1 will be described with reference to FIGS. 2 and 3 that describe the overall method of the present invention in greater detail.

Extraction Model Creation

Figure 2:
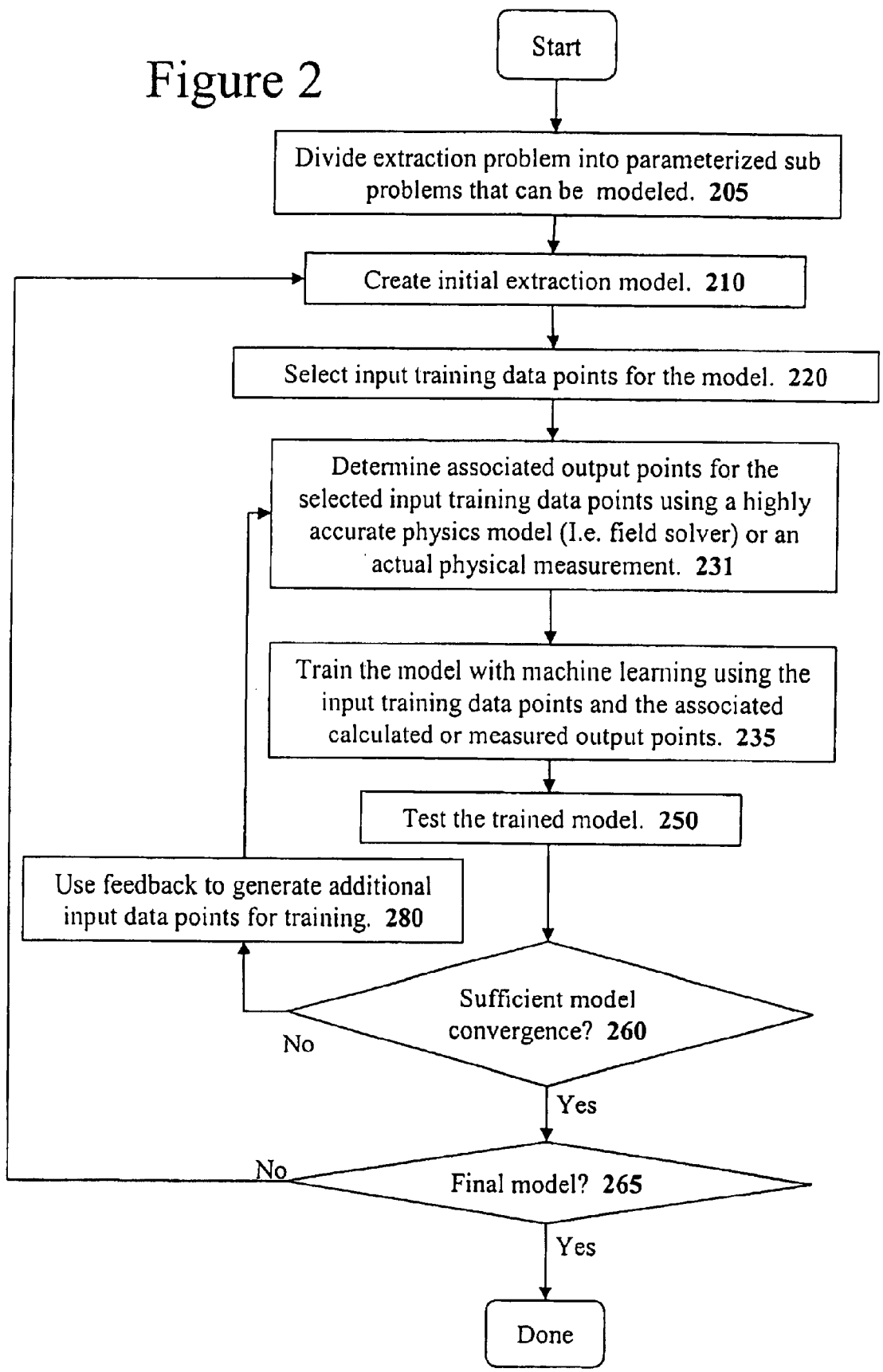
FIG. 2 illustrates a flow diagram that describes how the present invention creates a nonparametric model used for extraction.
Figure 3:
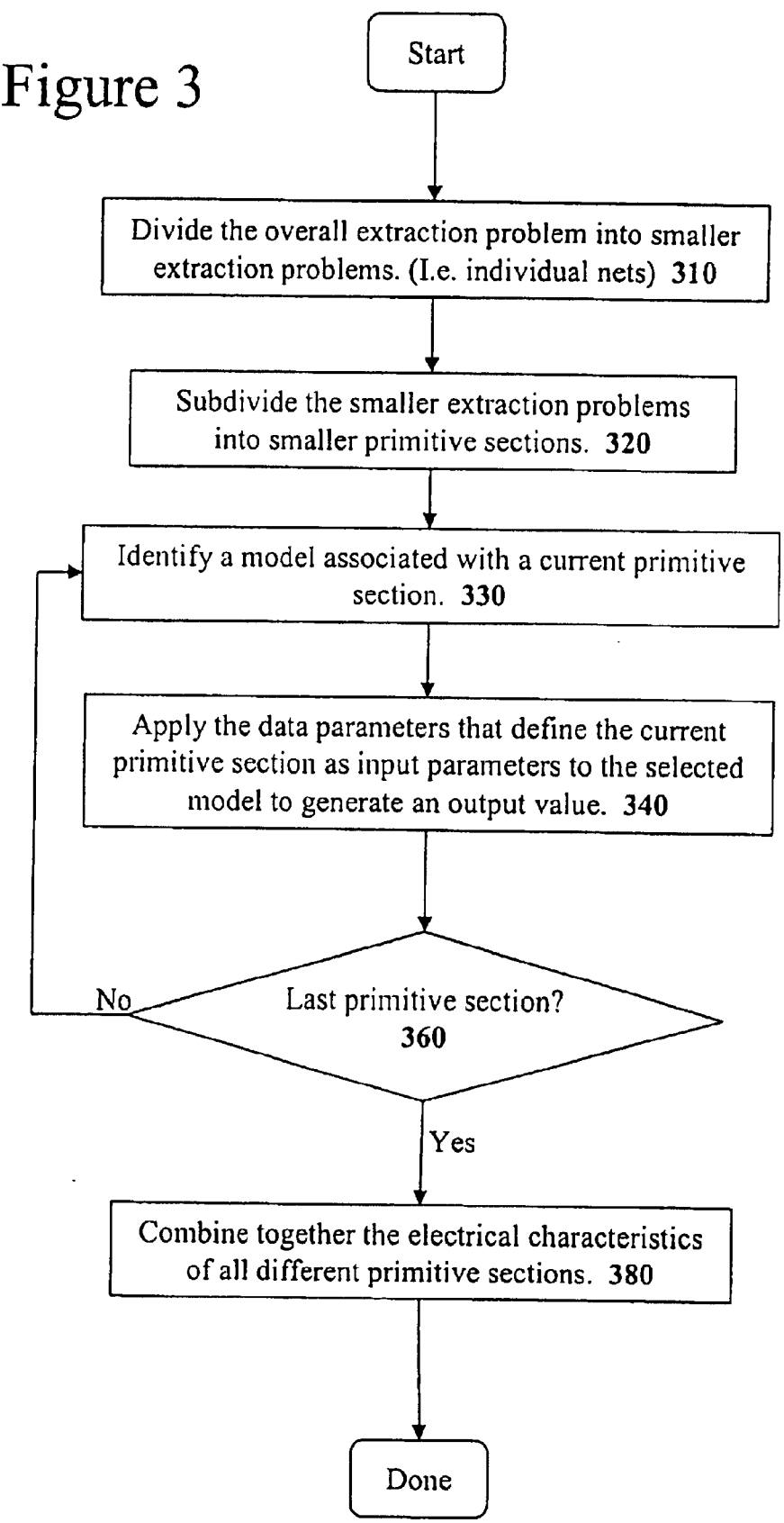
FIG. 3 illustrates a flow diagram that describes how an extraction system may use the extraction models of present invention during the extraction of electrical characteristics from a semiconductor design.

The top half of FIG. 1 describes the machine learning generation of a model function for a set of input and output training data. FIG. 2 provides a flow diagram for the model function creation using machine learning.

The system begins dividing the extraction problem into a number of smaller extraction problems that are more manageable at step 205. The smaller extraction problems must be identifiable and separable from an overall semiconductor integrated circuit design. Furthermore, there must be a reasonable method of determining the solutions for a set of examples of the smaller configuration. Manners of generating solutions for the set of examples include a highly accurate physics modeling (such as a field solver) or actual measurements from physical implementations. Extremely complex smaller extraction problems are not advisable since those complex extraction problems will be very difficult to solve.

Next, a model is created for each of the smaller extraction problems beginning with step 210. The system creates an initial extraction model design for a particular subdivided extraction problem at step 210. The subdivided smaller extraction problem should be parameterized by identifying a specific set of profile parameters completely define the subdivided extraction problem.

All parameters from a subdivided extraction problem that are constant may be dropped. For example, the physical material used for a conductor will directly affect the resistance of a conductive path. However, if the same material will be used for all implementations including the known training set and future problems to solve, then that material composition parameter may be dropped since it is constant for all cases. Similarly, the vertical distance between conductors on different metal layers affects the capacitance exhibited by the conductors and would be provided to an electromagnetic field solver that models capacitance. However, since the vertical distance between different metal layers is constant, such a vertical distance parameter may be dropped during the creation of an extraction model for the subdivided extraction problem. The initial model creation may further require the specification of model parameter such as priors that specify known information about the incoming data, as will be set forth in a later section.

Next, at step 220, a set of input data points are selected for the subdivided extraction problem. The input training data points should be carefully selected so as to create the best model. Details on how the input training data points are selected will be provided in the section on 'experimental design.'

Referring back to the overview diagram of FIG. 1, some system is used to generate the associated output data for the input profile configurations (the input training data). For some systems, the output data will be generated by complex physical model. For example, an electromagnetic field-solver may be used to generate output capacitance values for specific input configurations. Note that although certain constant terms may be dropped when creating a machine learning model, those constant terms must be provided to the field-solver so that it creates the proper output values. For some extraction problems, the output data may be generated by physically measuring selected output values from specific constructed input configurations. Specifically, referring to step 231 of FIG. 2, associated output points are generated for the input training data points using a highly accurate physics model or an actual physical measurement.

Next, at step 235, the input training data points and associated output points are used to train a model using machine learning. This is illustrated in FIG. 1 as "Model Creation". Many different machine-learning techniques may be used to perform "model creation". For example, Bayesian inference networks, Neural Networks, and Support Vector Machines (SVM) may be used to perform the machine learning. This document will focus on the use of Support Vector Machines. A number of techniques may be used to accelerate the often computationally intensive training task of machine learning.

Referring again to FIG. 2, after creating and training the model with the selected input training data, the trained models is tested at step 250. If sufficient convergence has been achieved as tested at step 260, then the trained model may be used for extraction. If the model has not reached sufficient convergence, then feedback from the testing is used to select additional input training data points at step 280. For example, if the model has problems creating sufficiently accurate output for certain areas of the input space, then additional training points from that area for the input space may be used to train the model. The system then proceeds to further refine the model using the selected input data points at step 231.

Extraction Model Application

Referring back to the overview diagram of FIG. 1, once a set of extraction models has been sufficiently trained, the set of extraction models may be used for extracting electrical features from an integrated circuit design. The lower half of FIG. 1 conceptually illustrates how the set of extraction models are used for extraction. FIG. 1 will be described with reference to FIG. 3 that illustrating a flow diagram that describes how extraction models may be used to extract electrical features from an integrated circuit design.

As with prior extraction system systems, the overall extraction problem is first divided into individual smaller extraction problems. A standard method of dividing the overall extraction problem is to divide the semiconductor integrated circuit into different nets as set forth in step 310.

Next, at step 320, the smaller extraction problems are further divided into small primitive sections that match the extraction models built with reference to FIGS. 1 and 2. For example, to perform capacitance extraction on a net, the net is divided into different sections having different two-dimensional capacitance profiles. Then, at step 330, the iterative process of analyzing each of the different sections begins.

First, at step 330, the system selects a specific extraction model associated with the two-dimensional profile that matches the current section. Then at step 340, the system provides the data parameters from the current section that specifically define the current two-dimensional profile to the selected extraction model. The extraction model then outputs a predicted electrical characteristic value using the model it created from the training data.

At step 360, the system determines if this is the last different section of the net. If this is not the last section, then the system returns to step 340 to analyze the next section of the net. If this is the final section of the net, then the system proceeds to step 380 where all the electrical characteristic values for the different sections are combined together to determine the overall electrical characteristics of the net.

Support Vector Machines

A Support Vector Machine (SVM) is a type of machine learning system based on a nonlinear generalization of the Generalized Portrait algorithm developed by Vapnik, Lerner, and Chervonekis in the 1960s. Vapnik has written several articles and books such as "The Nature of Statistical Learning Theory" (1995) that set forth the details of Support Vectors Machines.

An advantage that Support Vector machines have over neural networks is that an optimal solution can generally be determined. With neural networks, one may determine a solution that appears good but is actually just a local minimum in the solution space. Furthermore, evaluating a support vector machine is generally easier than evaluating a neural network due to the difficult numerous tangent functions in neural networks.

In general, the goal of a support vector machine is to take a known set of training data D where D={$(X_i, Y_i)$: i=1 to n} and determine a function $f(X_i)$ that has at most $\epsilon$ deviation from the actually obtain targets $Y_i$ for all the training data D and remain as flat as possible. Any errors less than $\epsilon$ are considered acceptable. One may begin by first examining linear functions.

$$f(x)=(w \cdot x)+b \text{ with } w \in X, b \in \Re \quad (1)$$

where X denotes the space of input patterns and • denotes the dot product in X. The flatness means that one is seeking for small w. One method of determining this is to minimize the Euclidean norm of the equation which is given by $\|W\|^2$. Formally, this is a convex optimization problem that requires:

$$\text{Minimize } \frac{1}{2}\|w\|^2 \quad (2)$$

$$\text{Subject to } \begin{cases} y_i - (w \cdot x_i) - b \leq \varepsilon \\ (w \cdot x_i) + b - y_i \leq \varepsilon \end{cases}$$

A convex optimization is not always feasible. Thus, one may wish to allow for a limited number of errors. Limited errors may be allowed by introducing slack variables $\xi_i, \xi_i^*$ to cope with the constraints that would make the system infeasible. This results in the Vapnik formulation of $$\text{Minimize } \frac{1}{2}\|w\|^2 + C\sum_{i=1}^{l}(\xi_i + \xi_i^*) \quad (3)$$

$$\text{Subject to } \begin{cases} y_i - (w \cdot x_i) - b \leq \varepsilon + \xi_i \\ (w \cdot x_i) + b - y_i \leq \varepsilon + \xi_i^* \\ \xi_i + \xi_i^* \geq 0 \end{cases}$$

where the constant C>0 determines a trade-off between the flatness of the function and the amount up to which errors larger than $\in$ are allowed. The formulation of equation (3) corresponds to the $\epsilon$ insensitive loss function described by:

$$|\xi|_\varepsilon := \begin{cases} 0 & \text{if } |\xi| \leq \varepsilon \\ |\xi| - \varepsilon & \text{otherwise} \end{cases} \quad (4)$$

FIG. 4 illustrates the situation graphically. Only points outside of the allowed error margin of $\pm\epsilon$ contribute to the cost.

The optimization problem of equation (3) is often solved in its dual formulation using Lagrange multipliers as set forth in the book by Fletcher entitled "Practical Methods of Optimization" published in 1989. The Lagrange function is given as $$L := \frac{1}{2}\|w\|^2 + C\sum_{i=1}^{l}(\xi_i + \xi_i^*) - \sum_{i=1}^{l}\alpha_i(\varepsilon + \xi_i - y_i + (w \cdot x_i) + b) - \quad (5)$$

$$\sum_{i=1}^{l}\alpha_i^*(\varepsilon + \xi_i^* + y_i - (w \cdot x_i) - b) - \sum_{i=1}^{l}(\eta_i\xi_i + \eta_i^*\xi_i^*)$$

where it is understood that the dual variables must be positive. It follows from the saddle point condition that the partial derivatives of L with respect to the primal variables have to vanish for the optimal situation. Thus:

$$\partial_b L = \sum_{i=1}^{l}(\alpha_i^* - \alpha_i) = 0 \quad (6)$$

$$\partial_w L = w - \sum_{i=1}^{l}(\alpha_i^* - \alpha_i)x_i = 0 \quad (7)$$

$$\partial_{\xi_i^{(*)}} L = C - \alpha_i^{(*)} - \mu_i^{(*)} = 0 \quad (8)$$

Substituting equations (6), (7), and (8) into the Lagrange equation of (5) yields the formal dual optimization problem of:

$$\text{Maximize} \begin{cases} -\frac{1}{2}\sum_{i,j=1}^{l}(\alpha_i^* - \alpha_i)(\alpha_j^* - \alpha_j)(x_i \cdot x_j) \\ -\varepsilon\sum_{i=1}^{l}(\alpha_i^* + \alpha_i) + \sum_{i=1}^{l}y_i(\alpha_i - \alpha_i^*) \end{cases} \quad (9)$$

$$\text{Subject to} \begin{cases} \sum_{i=1}^{l}(\alpha_i^* - \alpha_i) = 0 \\ \alpha_i, \alpha_j^* \in [0, C] \end{cases}$$

Equation (7) may be reformatted into a Support Vector expansion where w can be completely described as a linear combination of the training data $x_i$ as follows:

$$w = \sum_{i=1}^{l}(\alpha_i - \alpha_i^*)x_i \text{ and therefore} \quad (10)$$

$$f(x) = \sum_{i=1}^{l}(\alpha_i - \alpha_i^*)(x_i \cdot x) + b$$

Using kernels, the Support Vector expansion may be expanded into the following nonlinear form $$w = \sum_{i=1}^{l}(\alpha_i - \alpha_i^*)\Phi(x_i) \text{ and therefore} \quad (11)$$

$$f(x) = \sum_{i=1}^{l}(\alpha_i - \alpha_i^*)k(x_i \cdot x) + b$$

Detailed information on the derivation of the nonlinear form can be found in the paper entitled "A Tutorial on Support Vector Regression" by Alex Smola and Bernhard Schölkopf (October, 1998).

Figure 5:
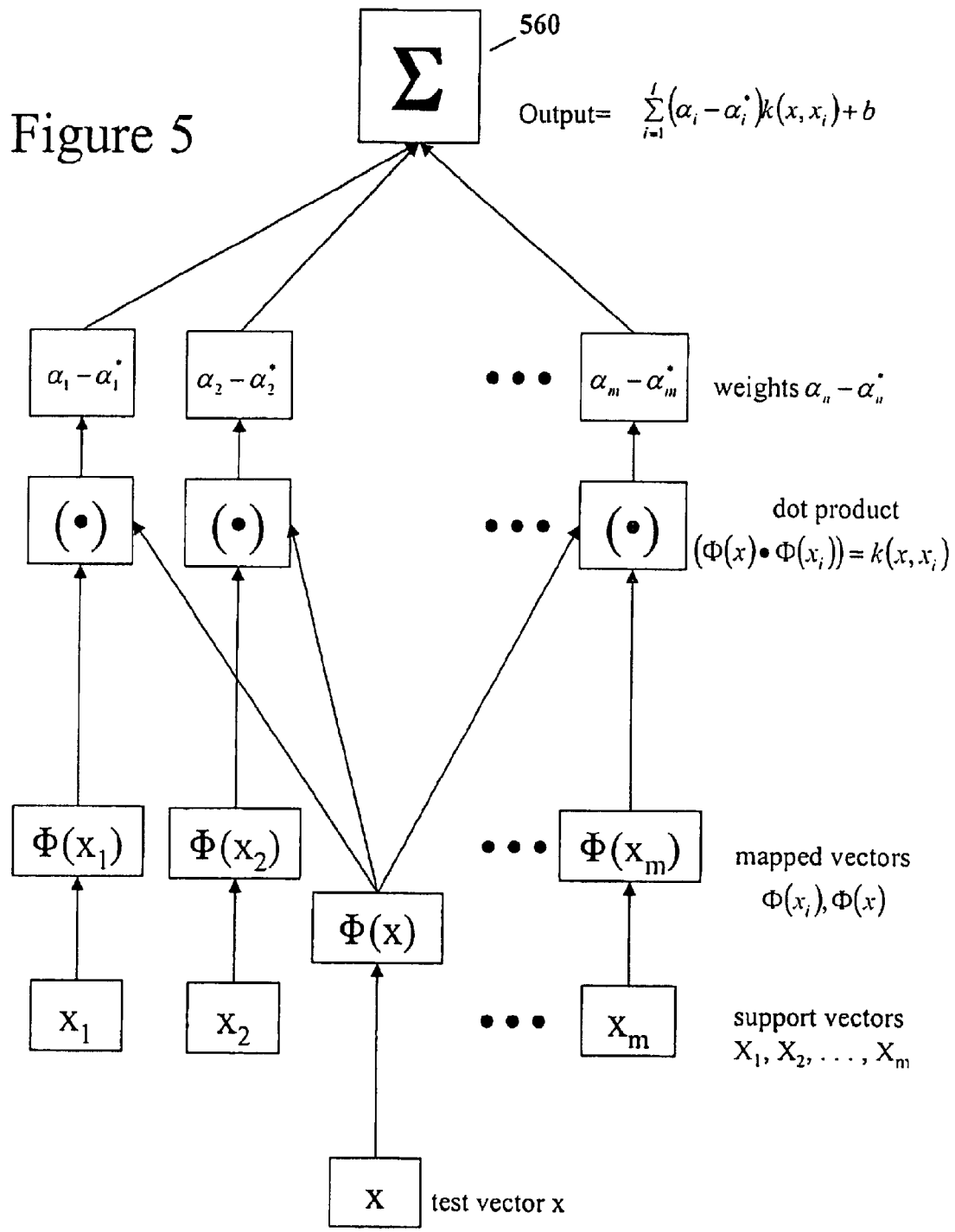
FIG. 5 graphically illustrates a block diagram of a non linear support vector machine used for regression.

Using the non linear Support Vector expansion, a system that performs support vector regression may be created. Such a Support Vector Machine is illustrated in FIG. 5.

Thus, the combination output provided by the output unit 560 as set forth in equation (11) can accurately represent nearly any function within an error of $\in$. Thus, with the proper values for the weights (($\alpha_i - \alpha_i^*$)) and support vectors ($x_1, x_2, \ldots, x_m$), a support vector machine can be used to accurately approximate a complex unknown function that specifies the electrical characteristics (the extraction problem solution) for a particular configuration provided that the configuration can be complete parameterized as a set of input variables. As previously set forth, parameters that will be constant in both the training set and the actual extraction problems to be solved may be discarded from the parameter set. Discarding constant parameters simplifies the creation of the support vector machine.

Experimental Design Training Point Selection

Since machine-learning systems are completely dependent upon the training data, great care must be taken to select very good training data points for training the machine learning system. Several different methods of selecting input data have been analyzed.

Boundary Value Input Data

A first method of selecting a set of training data input points is to select a wide variety of boundary conditions for the input parameter space. For example, one may wish to create training data containing every permutation of the smallest, mean, and largest input parameter values. An example of determining boundary values is set forth with reference to FIG. 6.

Figure 6:
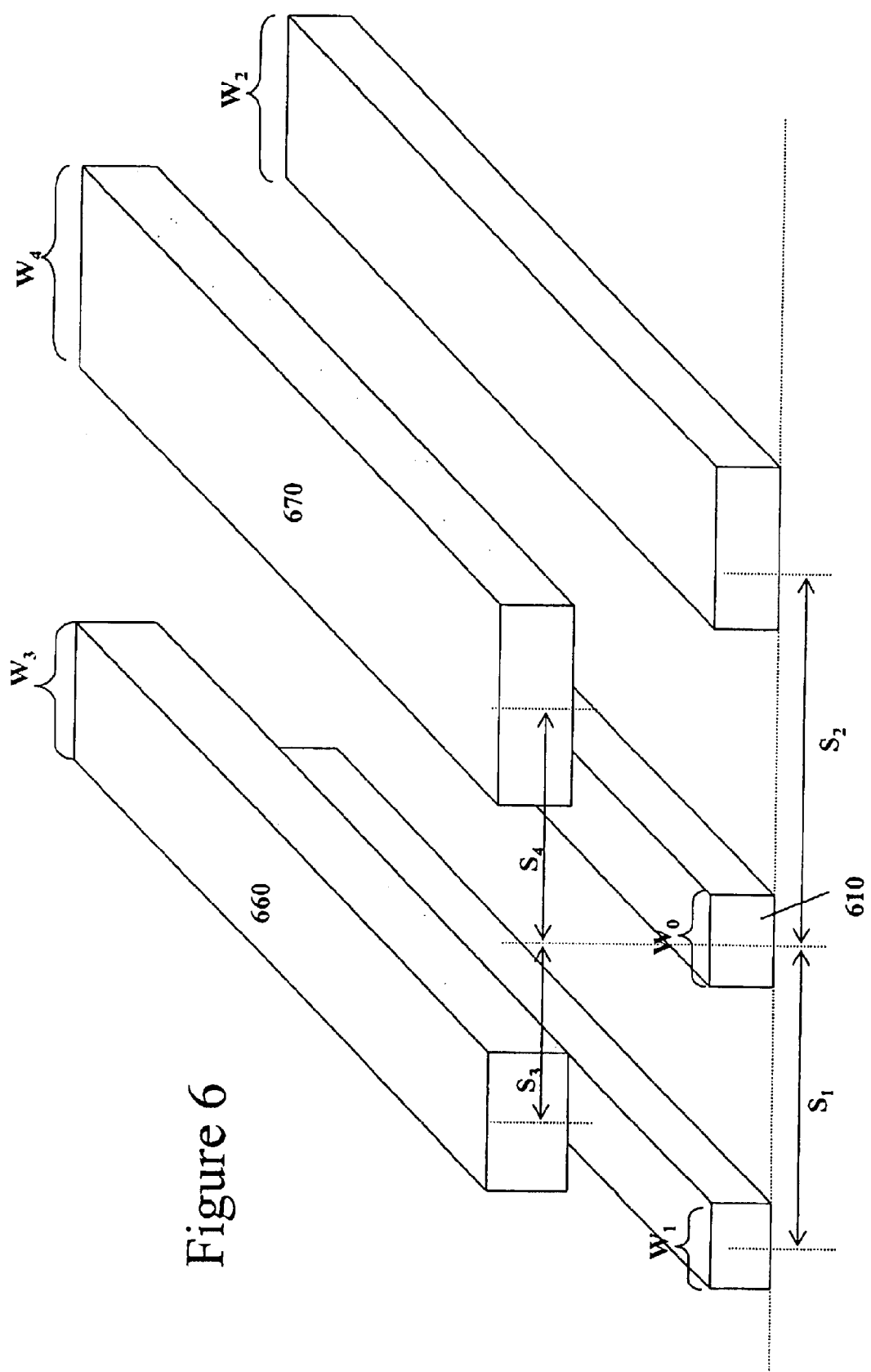
FIG. 6 illustrates a semiconductor interconnect line 610 surrounded by four other parallel interconnect lines, two on the same layer and two on the above layer.

FIG. 6 illustrates a semiconductor interconnect line 610 surrounded by four other parallel interconnect lines, two on the same layer and two on the above layer. To determine the parasitic capacitance of interconnect line 610, the relevant physical characteristic information are the size of the five interconnect lines and the distance between analyzed interconnect line 610 and the other interconnect lines.

Since the height of the interconnect lines is constant as set by the semiconductor process, the height of the interconnect lines can be ignored. Thus, one embodiment only considers the width of the five interconnect lines ($W_0, W_1, W_2, W_3$, and $W_4$) to specify the size of the interconnect lines. Similarly, the vertical distance separating the semiconductor layers is constant and dictated by the semiconductor process Thus, the vertical distance between the analyzed interconnect line 610 and the other interconnect lines may be ignored. One embodiment of the present invention therefore only considers the horizontal distance between the analyzed interconnect line 610 and the other interconnect lines ($S_1, S_2, S_3$, and $S_4$). Thus, the capacitance problem of FIG. 6 can be completely parameterized with nine physical measurements: $W_0, W_1, W_2, W_3, W_4, S_1, S_2, S_3$, and $S_4$.

To test the boundary conditions and the mean conditions, every permutation should be used as an input training point. Specifically, all combinations of smallest, mean, and largest input parameter values for all nine measurements should be tested. Thus, there will be $3*3*3*3*3*3*3*3*3=3^9=19,683$ training points. 19,683 is an unreasonably large number of training points to solve with field solvers and to use for training the support vector machine.

Experimental Design Training Point Selection

Figure 7:
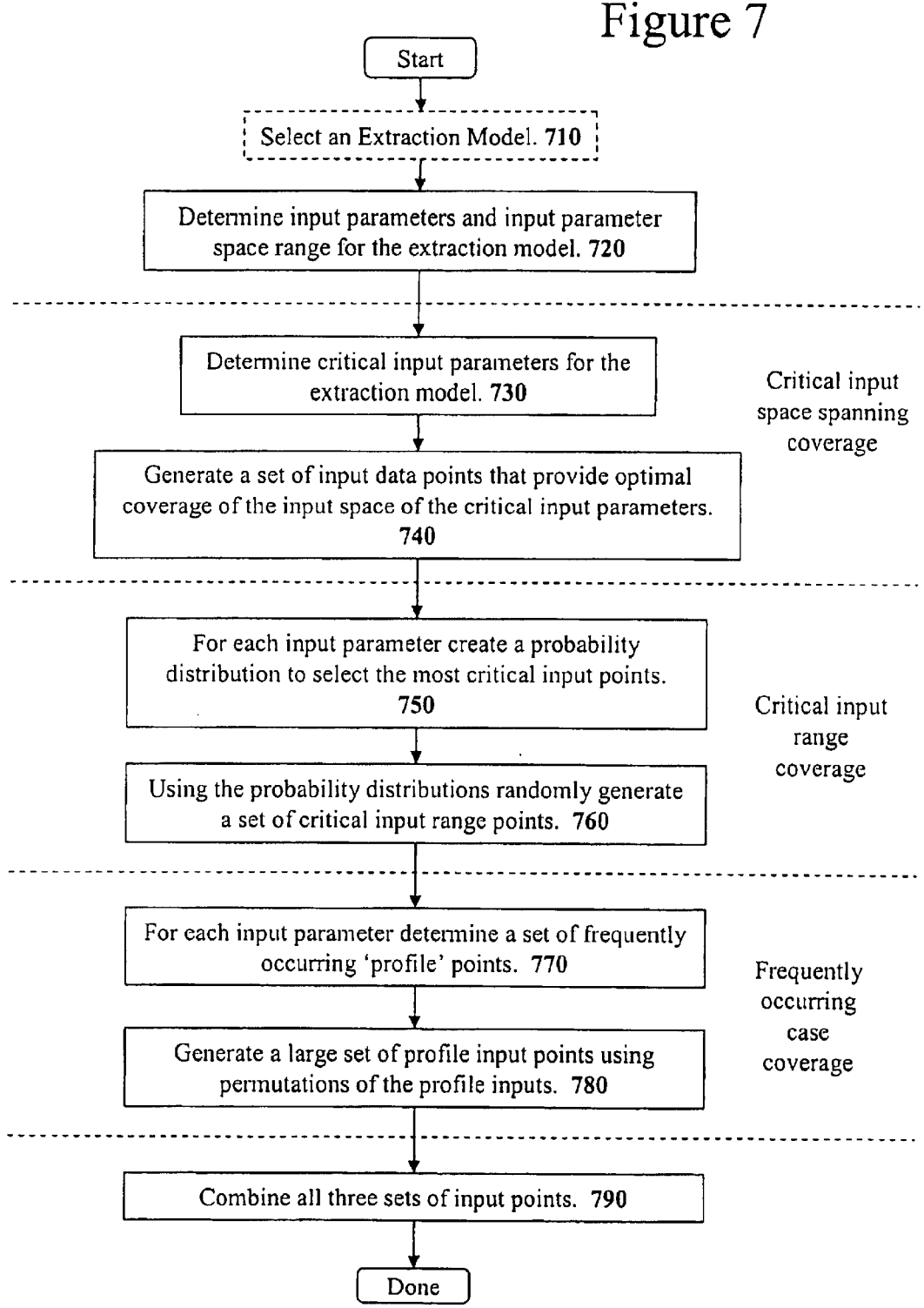
FIG. 7 illustrates one embodiment of a method that uses experimental design to select optimal training data points.

One method of selecting training points employed by the present invention is to use experimental design techniques to optimize the input point selection. The experimental design techniques are designed to obtain highly informative points such that a relatively small number of training points will be able to create a model with a highly accurate output for the cases that will be most likely encountered. One embodiment of the experimental design techniques used by the present invention is set forth with reference to FIG. 7.

First, at step 710, a particular extraction model is selected. The extraction model will comprises a set of input parameters that fully defined the information needed to determine the desired electrical characteristic (the output). As previously set forth, the input parameters for a capacitance extraction may comprise the interconnect line widths and the interconnect line spacings that would be required to calculated the capacitance. The extraction model is required during the experimental design since selection of input points requires information about the model Next, at step 720, the experimental design system determines an input parameters range for each input parameter. The input parameters range for an input parameter defines the smallest possible input value and the largest possible value for the input parameter.

Input Space Spanning Coverage

In order to be able to generate an acceptable output result no matter what legal input is given, the training data points should include points from every part the input space. In order to be able to generate an acceptable output result no matter what legal input is given, the training data points should include points from nearly every part the input space. Thus, a set of 'input space spanning' coverage points should be generated that span the entire input space range. But since the input space may be extremely large, careful consideration should be put into selecting the spanning coverage input points.

Not all of the input parameters are extremely informative. Some input parameters are very critical for determining the output and other input parameters only slightly affect the output. Thus, to reduce the size of the 'critical' input space, the critical input parameters need to be identified as set forth in step 730. To determine the critical input space, a large set of input points and associated output points are provided to a critical point identification program. A critical point identification program carefully examines the input points and associated output points to determine which input parameters have the greatest effect on the output. A number of different critical point identification programs are well-known in the art. One example of a critical input point identification program is the 'Gosset' program described in the paper entitled "A New Approach to the Construction of Optimal Designs" by R. H. Hardin and N. J. A. Sloane in the Journal of Statistical Planning and Inference", vol. 37, 1993, pp. 339–369.

After running the critical point identification program, a set of critical input parameters have been identified. Next, at step 740, a set of critical input space spanning points are determined. The critical input space spanning points are intended to evenly cover the entire critical input space. The creation of a set of critical input space spanning points is similar to the well-known 'orange-packing' problem wherein the task is to determine the optimal packing configuration of spheres into a box. Specifically, an input space spanning point selection problem for system with three inputs is similar to the orange-packing problem since the three dimensions of the input space can be viewed as three dimensions of the box and the selection of the input points is similar to the selection of the orange locations. The center of each orange can be viewed as the input point and the surrounding area of the orange is similar to the input region space 'covered' by that input point. The object is to select the input points (orange locations) that most densely fill the input space (the orange box).

A number of programs exist for solving the orange packing problem in a number of dimensions. Thus, to select the critical input space spanning points, the number of dimensions and the size of each dimension are provided to one of the programs such that the program outputs a set of critical input space spanning points. One program that may be used is provided in the paper entitled "Computer-Generated Minimal (and Larger) Response Surface Designs" by R. H. Hardin and N. J. A. Sloane. Thus, step 740 generates a set of points that evenly covers the input space.

Critical Input Range Coverage

The entire input range of each input parameter is not equally important. For example, when two interconnect lines are close to each other then slight changes in the interconnect line spacing can dramatically affect the capacitance but if the interconnect lines are far apart then slight changes in the interconnect line spacing only negligibly affect the capacitance. Furthermore, certain feature sizes are far more likely to be encountered than other feature sizes. Thus, to obtain the best model, a large number of input points should come from the critical areas that significantly affect the output. Fewer points should come from the portion of the input range that does not affect the output much.

The present invention uses a probabilistic method of implementing such a system. Specifically, at step 740, a probability distribution is assigned to each input parameter. The probability distribution is designed such that the highest probability is located in the critical portions of the input range and the lower probability areas are located in the non critical areas. Once a probability distribution has been assigned to each input parameter, then, at step 750, the probability distributions are used to generate a set of input points that will concentrate on the most important regions of the input space.

Figure 8:
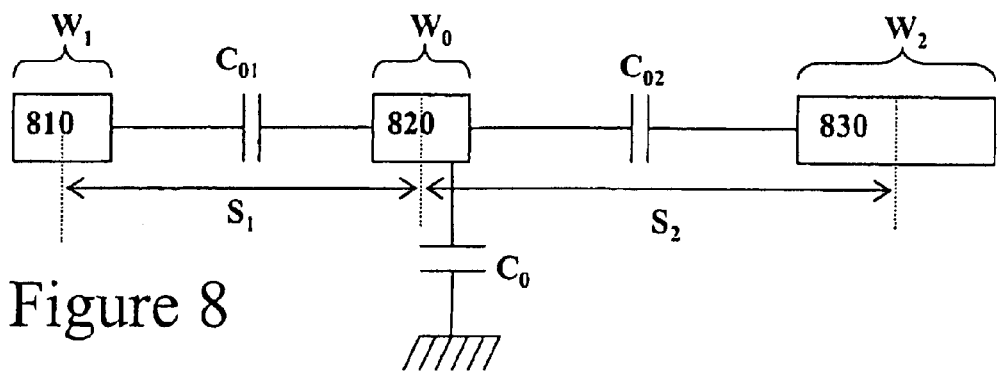
FIG. 8 illustrates a capacitance extraction problem wherein an interconnect line 820 is set between interconnect line 810 to the left and interconnect line 830 to the right.
Figure 9A:
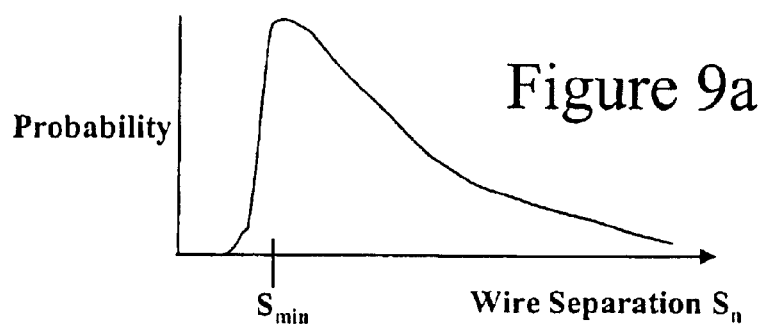
FIG. 9A illustrates a probability distribution for generating important line spacings for the capacitance extraction problem of FIG. 8.
Figure 9B:
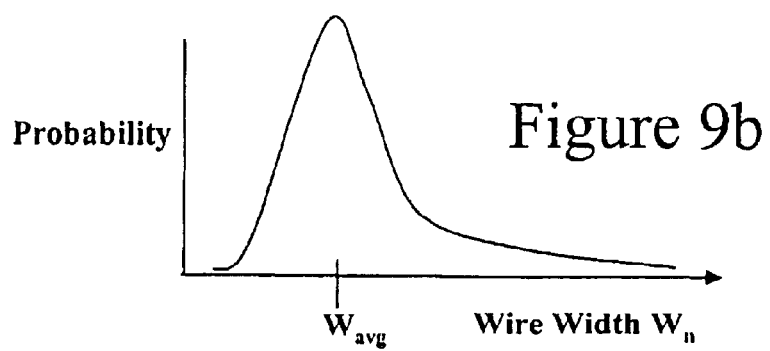
FIG. 9B illustrates a probability distribution for generating important interconnect line widths for the capacitance extraction problem of FIG. 8.

An example will be provided with reference to FIGS. 8, 9A, and 9B. FIG. 8 illustrates a capacitance extraction problem wherein an interconnect line 820 of width $W_0$ is set between interconnect line 810 of width $W_1$ a distance $S_1$ to the left and interconnect line 830 of width $W_2$ a distance $S_2$ to the right. The objective is to determine the capacitance of interconnect line 820 comprising of ground plane capacitance $C_0$, capacitance $C_{01}$ from interconnect line 810, and capacitance $C_{02}$ from interconnect line 830.

As set forth above, small changes in interconnect line spacing for distant interconnect lines do not significantly affect the capacitance such that few input points should specify distant interconnect lines. But small changes in interconnect line spacing for nearby interconnect wires drastically change the capacitance, thus a large number of input points should specify interconnect lines that are close together. However, very few (if any) interconnect lines spacings should be less than the minimum allowed line spacing $S_{min}$. Thus, a probability distribution for the line spacings may appear as illustrated in FIG. 9A.

The interconnect wire widths affect the capacitance but not as drastically as the interconnect line spacings. But since most interconnect wires will have approximately the same width, most input points should be around the average width, $W_{avg}$. Thus, a probability distribution for the interconnect wire widths may appear as illustrated in FIG. 9B. Note that a gamma probability function with appropriate parameters may be used to generate the probability function illustrated in FIG. 9B.

To generate a set of critical range input points for the capacitance case of FIG. 8, the probability distributions of FIG. 9A and FIG. 9B may be used. Specifically, interconnect line separations $S_1$ and $S_2$ should be selected using the probability distribution of FIG. 9A and the interconnect line widths $W_0$, $W_1$, and $W_2$ should be selected using the probability distribution of FIG. 9B.

Profile Case Coverage

Depending on the semiconductor process that is being used, certain input points will appear very frequently. These frequently appearing input points should be very well covered by the training data used to create machine-learning models in order to produce very accurate results for those very frequent occurring cases.

Figure 10:
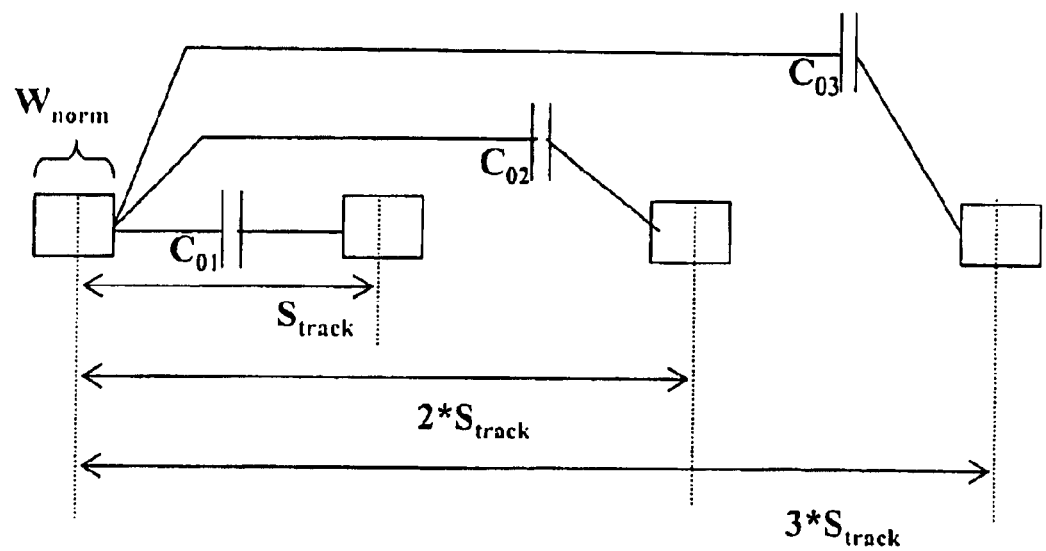
FIG. 10 illustrates a capacitance extraction problem demonstrating profile capacitance extraction cases.

FIG. 10 illustrates a cross-sectional view of a first interconnect line with a width of $W_{norm}$ and is flanked on the right by three more interconnect lines. In most semiconductor manufacturing processes, the interconnect lines are generally all approximately the same width. In this case, most interconnect lines will be a width of $W_{norm}$ such that a large number of 'profile' cases should cover situations having interconnect lines of a width of $W_{norm}$.

Many semiconductor designs use fixed wiring grids wherein all interconnect lines are aligned on a defined wiring grid. The allowable positions for interconnect lines are sometimes referred to as 'tracks.' In the example configuration of FIG. 10, the wiring grid spaces the interconnect lines apart by a distance of $S_{track}$ on center. In such a gridded architecture, most nearby interconnect lines will be separated by an integer multiple of $S_{track}$ on center ($S_{track}$, $2*S_{track}$, $3*S_{track}$, etc.). Thus, a set of profile configurations contain all permutations of interconnect lines an integer multiple Of $S_{track}$ on center should be made into training points.

By selecting permutations of all the common 'profile' cases as input training points, the system will be nearly guaranteed to generate very accurate answers for the most commonly encountered situations in a real semiconductor integrated circuit.

To fully describe the present invention, examples of the application of these machine-learning techniques will be provided in the following sections. Specifically, the application of machine learning to interconnect line capacitance extraction problems and interconnect line resistance extraction problems will be described.

Capacitance Extraction

Figure 11A:
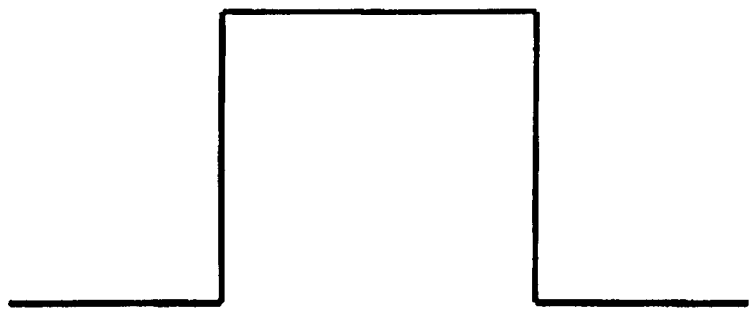
FIG. 11A illustrates an ideal signal pulse.

Semiconductor integrated circuits use metal layers with interconnect wires to carry electrical signals between various circuit elements. These interconnect wires are susceptible to performance degradation due to parasitic capacitance. For example, FIG. 11A illustrates an ideal digital signal pulse. Note that the ideal digital signal pulse has an immediate transition between voltage levels such that the digital signal pulse appears very square. However, no real signal pulse can match the ideal digital signal pulse. One reason that such an ideal cannot be achieved is that parasitic capacitance in all circuits degrades the signal.

Capacitance Effects

Figure 11B:
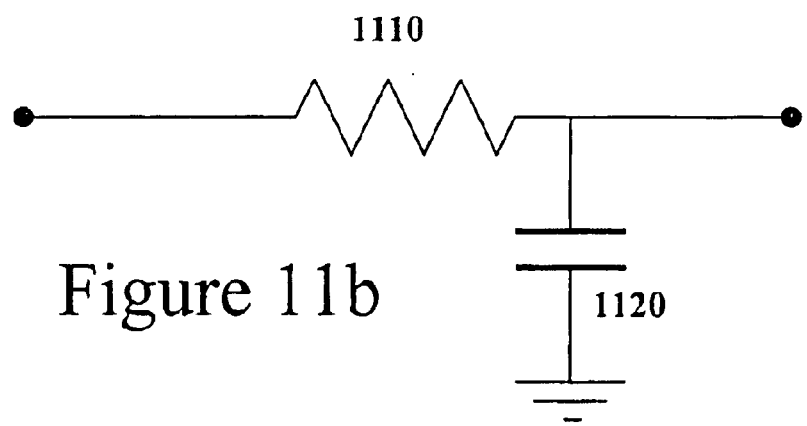
FIG. 11B illustrates a circuit for modeling parasitic capacitance.
Figure 11C:
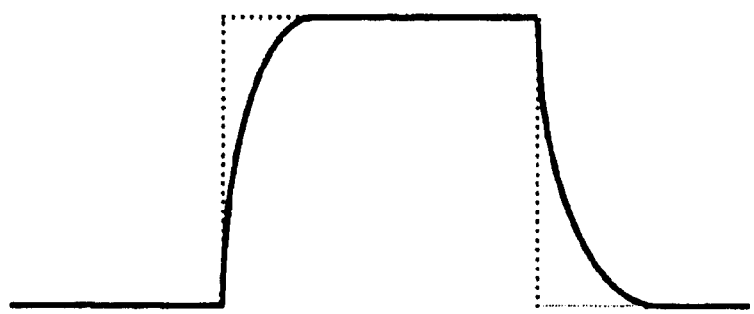
FIG. 11C illustrates the digital signal pulse of FIG. 11A after it has been affected by capacitance.

FIG. 11B illustrates how the parasitic capacitance on interconnect wire may be modeled. The capacitance may be modeled as an "RC" (Resistor-Capacitor) circuit. The resistor 1120 lowers the voltage and the capacitor 1110 must be charged or drained upon a voltage state change. FIG. 11C illustrates how the ideal digital signal pulse of FIG. 11A is more likely to appear in a real world application. Note that the resistance of resistor 1120 and the need to charge the capacitor 1110 slow the voltage rise at the beginning of the digital signal pulse. Similarly, the voltage drop at the end of the digital signal pulse is slowed.

Figure 12A:
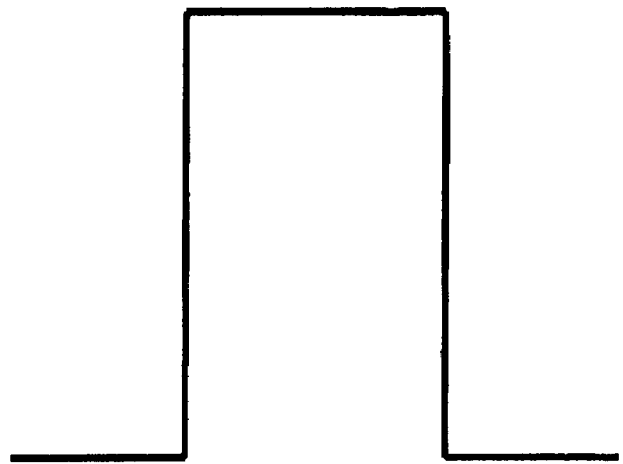
FIG. 12A illustrates an ideal signal pulse.
Figure 12B:
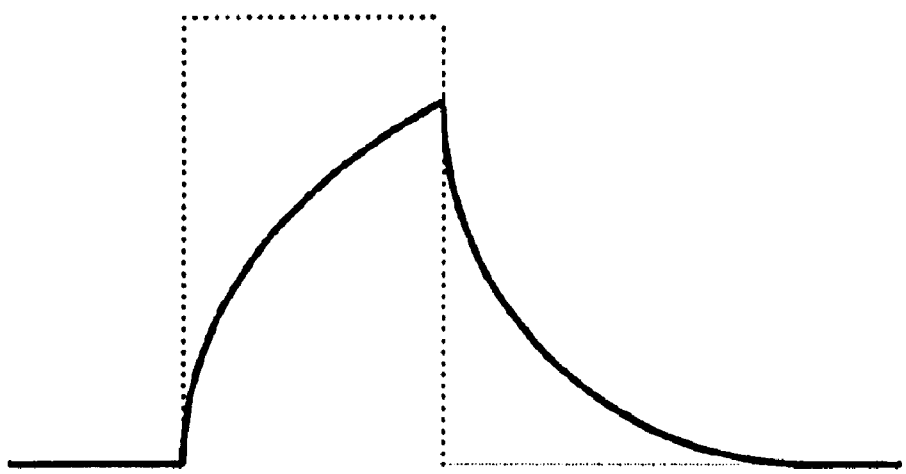
FIG. 12B illustrates a real world signal pulse that did not reach its fill voltage level due to parasitic capacitance.

Severe capacitance can cause a circuit to malfunction. For example FIG. 12A illustrates an ideal digital signal pulse and FIG. 12B illustrates the ideal digital signal pulse of FIG. 12A after it has been affected by severe parasitic capacitance. As illustrated in FIG. 12B, the signal fails to reach the full active voltage level when it is affected by severe capacitance. Thus, parasitic capacitance may cause the read-out circuit to sample an incorrect voltage level.

As illustrated with reference to FIGS. 11B and 11C, the resistance and capacitance of an interconnect wire affect the ability of that interconnect wire to carry a signal. Thus, it is desirable to determine these resistance and capacitance values to determine if the performance degradation is too severe. The resistance value of an interconnect wire can be relatively easily estimated using the geometry of the interconnect wire and the material composition of that interconnect wire. However, the capacitance value of an interconnect wire depends on the interconnect wire's proximity to other interconnect wires. Thus, one must consider the effects of all the other nearby interconnect wires to extract the capacitance of a particular interconnect wire.

A Capacitance Extraction Example

In a typical integrated circuit design, all interconnect wires are vertical or horizontal. This orthogonal wiring architecture allows for certain efficiencies in extraction of the capacitance values from an interconnect wire layout. FIGS. 13A to 13H will be used to provide an example of how capacitance may be extracted from an integrated circuit design.

Figure 13A:
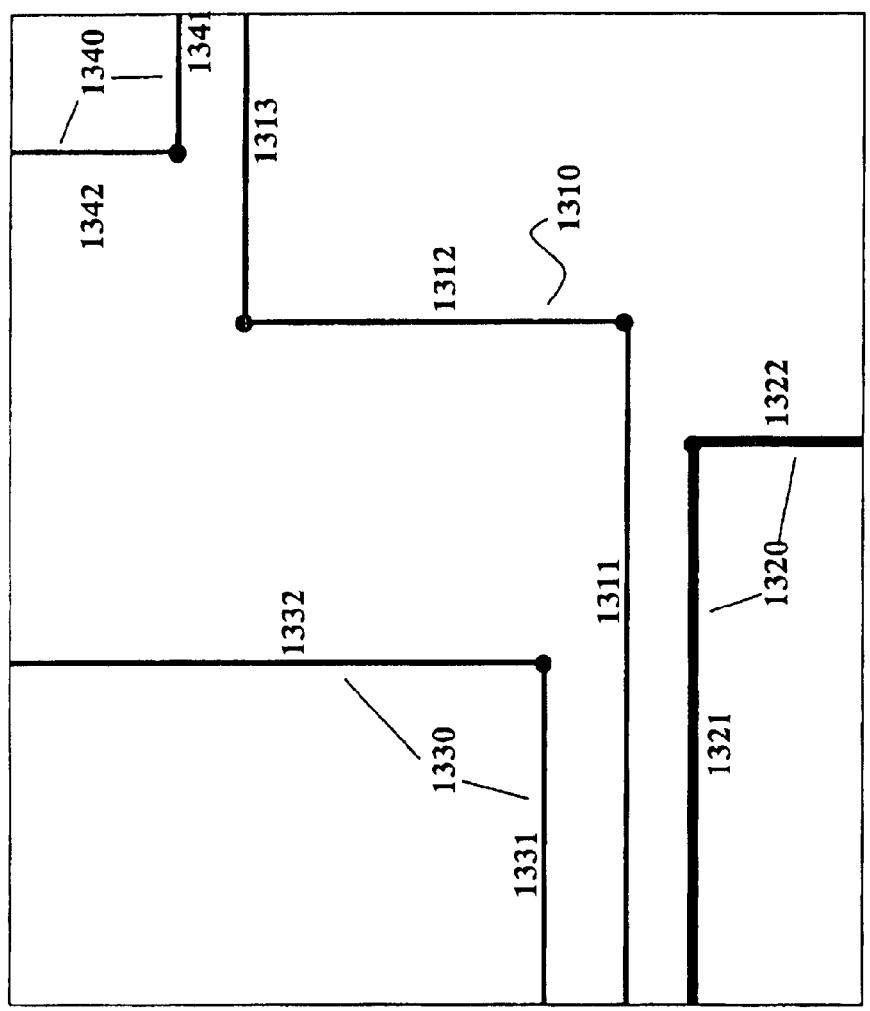
FIG. 13A illustrates an example of interconnect wires arranged for an integrated circuit layout.

FIG. 13A illustrates the top view an example layer of interconnect wiring for an integrated circuit that uses "Manhattan" (restricted to only horizontal and vertical) interconnect wire routing. The layout example of FIG. 13A contains four different "nets" (interconnect wires) 1310, 1320, 1330, and 1340. Each net illustrated in FIG. 13A is constructed only from horizontal interconnect wire segments and vertical interconnect wire segments as is required by Manhattan wire routing. For example, net 1310 is constructed from horizontal wire segment 1311, vertical wire segment 1312, and horizontal wire segment 1313. Similarly, net 1320 is constructed from horizontal interconnect wire segment 1321 and vertical interconnect wire segment 1312. (Although the example provided with reference to FIGS. 13A to 13H uses Manhattan wiring for simplicity of explanation, the teachings present invention are not limited to extraction on integrated circuits containing Manhattan interconnect line wiring.)

To provide an example of capacitance extraction, the capacitance of a first horizontal portion of critical net 1310 in FIG. 13A will be determined. In common capacitance extraction parlance, the interconnect wiring of net 1310 will be the "aggressor" wire and the other wire segments that effect the capacitance of net 1310 will be the "victim" wires.

Limiting the Capacitance Extraction Problem

Figure 13B:
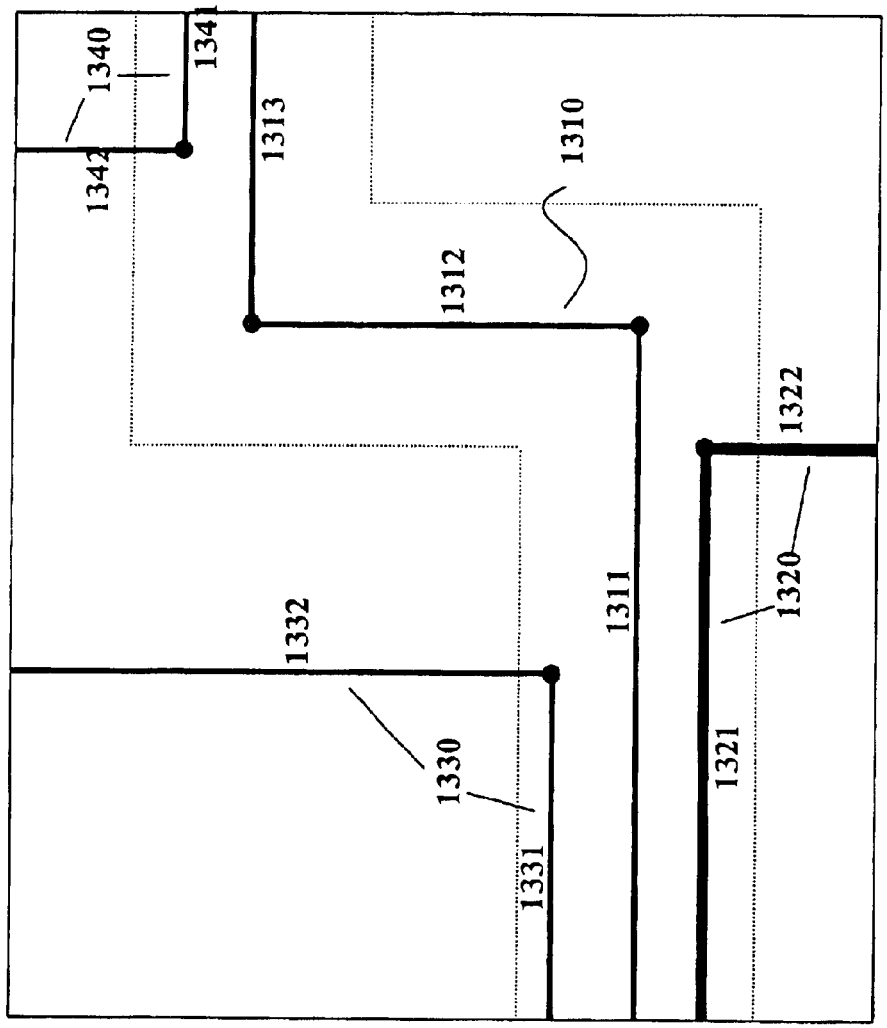
FIG. 13B illustrates the interconnect wires of FIG. 13A with a capacitance effect "halo" drawn around critical net 1310.
Figure 13C:
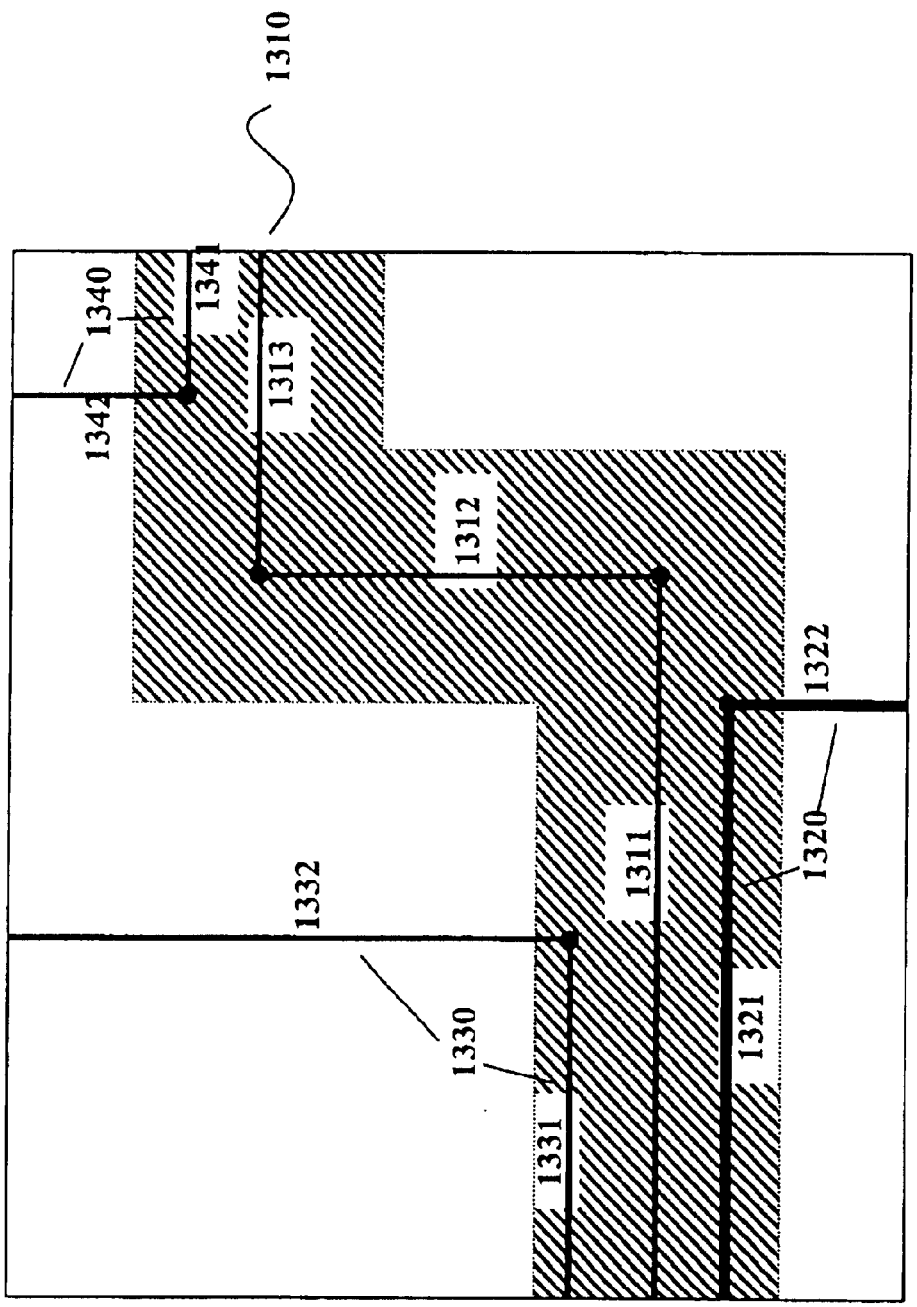
FIG. 13C illustrates the interconnect wires of FIG. 13B with the capacitance effect region around critical net 1310 highlighted.

The first step in determining the capacitance of net 1310 is to limit the scope of the capacitance extraction problem. Interconnect wires that are far from net 1310 will only have a very tenuous effect on the capacitance of net 1310 and therefore can be ignored. Thus, FIG. 13B illustrates a "halo" drawn around net 1310 that will limit the scope of other interconnect wires considered to materially affect the capacitance of net 1310. Specifically, all the interconnect wires within the shaded region of FIG. 13C will be considered to affect the capacitance of net 1310. Any interconnect wires not within the shaded region of FIG. 13C will be considered to have no material affect the capacitance of net 1310.

The "halo" illustrated in FIG. 13B only appears to limit the scope in two-dimensions along the same layer of the aggressor net 1310. However, the halo actually extends in all three dimensions including the vertical dimension not shown. Specifically, interconnect wires on other nearby metal layers are also considered. However, other interconnect layers are not mentioned in this example for simplicity. In one embodiment of the present invention, the capacitance extraction system limits the scope of the problem in the vertical dimension by only considering interconnect wires in metal layers within two layers of the aggressor net.

The most common current technique for computing capacitance effects (also known as extracting capacitance values) due to a three-dimensional configuration of interconnecting wires is to decompose the problem into a series of two-dimensional profile sections that have capacitance values that are generally proportional to their length. The total capacitance of the three-dimensional net configuration is then determined by calculating a weighted sum of the individual two-dimensional profiles where the weights are the lengths of the different two-dimensional profiles. This technique is performed along two different dimensions such that there is both a horizontal and vertical scan of the interconnect wire section.

Thus, the next step in extracting the capacitance in a Manhattan routed integrated circuit is to divide the problem into a series of sections with different two-dimensional profiles. Each section then has a capacitance value that is estimated by multiplying the length of the section with a capacitance-per-length value of the two-dimensional profile. The capacitance-per-length values of the various different two-dimensional profiles are calculated by running a two-dimensional field solver on the two-dimensional profiles.

Figure 13D:
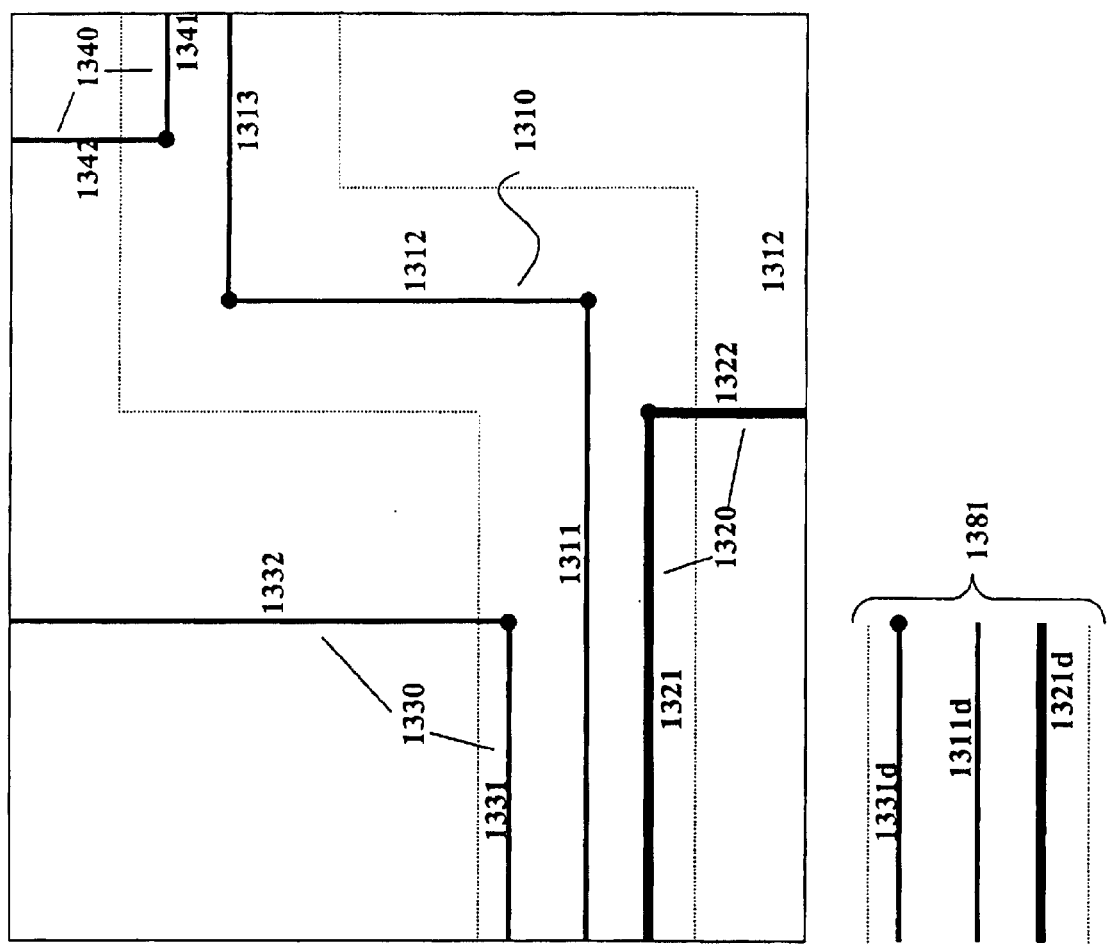
FIG. 13D illustrates the calculation of the capacitance for a first horizontal section of critical net 1310.

For example FIGS. 13D to 13H illustrate the horizontal scan of the first section along interconnect wire 1311 of net 1310 in integrated circuit of FIG. 13A. The scan begins on the left side with FIG. 13D. FIG. 13D illustrates the interconnect wiring of FIG. 13A with a first two-dimensional section 1381 of interconnect wire 1311 duplicated below the integrated circuit. As illustrated in FIG. 13D, the duplicated section of interconnect wire 1311 is surrounded by an environment unchanging along one (horizontal) dimension within the "halo" until horizontal interconnect wire 1331 intersects with vertical interconnect wire 1332. To calculate the capacitance for this first two-dimensional section of interconnect wiring 1381, a modeled capacitance per unit length of section 1381 is multiplied by the length of section 1381 (the length of interconnect wire 1331).

Figure 13E:
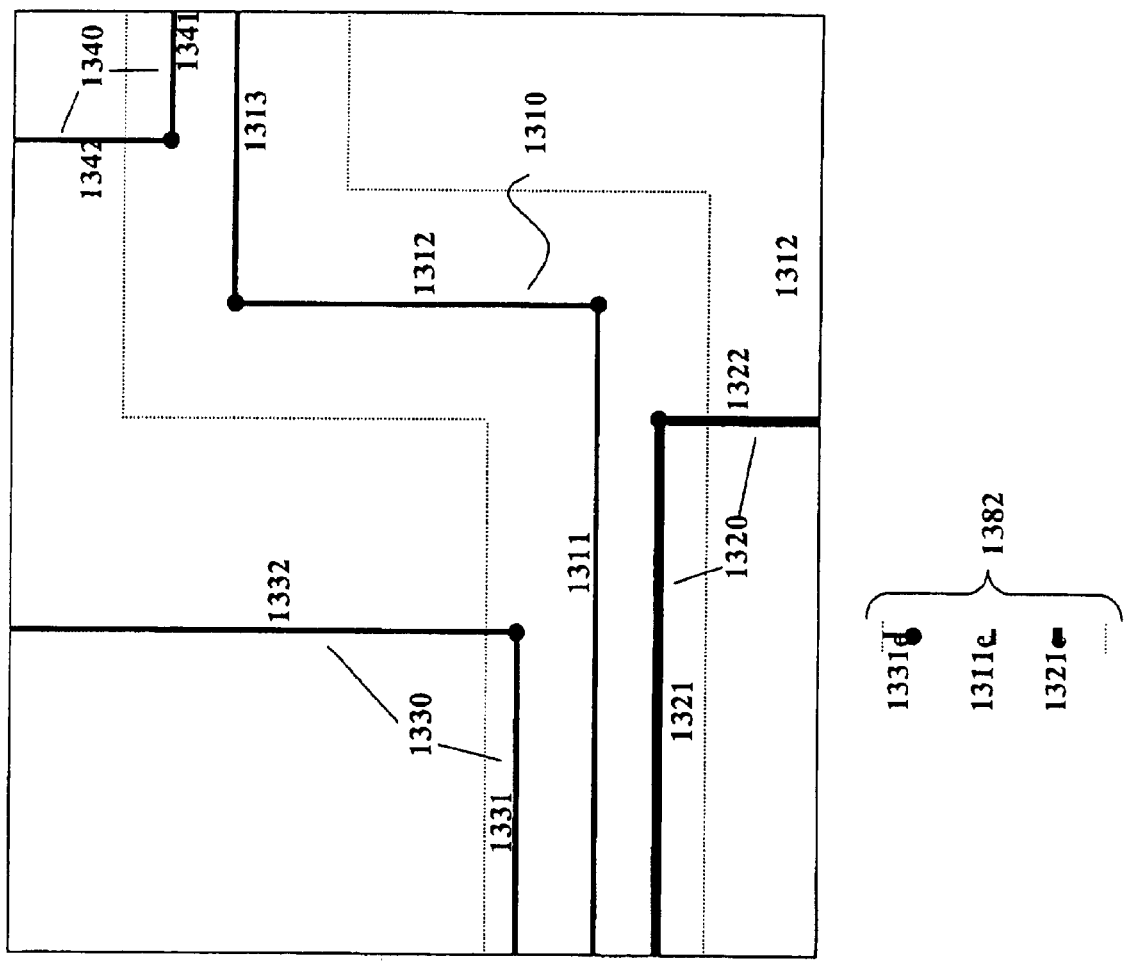
FIG. 13E illustrates the calculation of the capacitance for a second horizontal section of critical net 1310.

At the point where horizontal interconnect wire 1331 intersects with vertical interconnect wire 1332, the surrounding environment around interconnect wire 1311 of net 1310 changes. Thus, a second different section 1382 of net 1310 is duplicated below the integrated circuit in FIG. 13E. The short section 1382 of FIG. 13E is used to take into account the capacitance effect of vertical interconnect wire 1332 on horizontal interconnect wire 1311 of net 1310. To determine the capacitance of section 1382, an extraction system multiplies a modeled capacitance per unit length of section 1382 by the length of section 1382 (the width of vertical interconnect wire 1332).

Figure 13G:
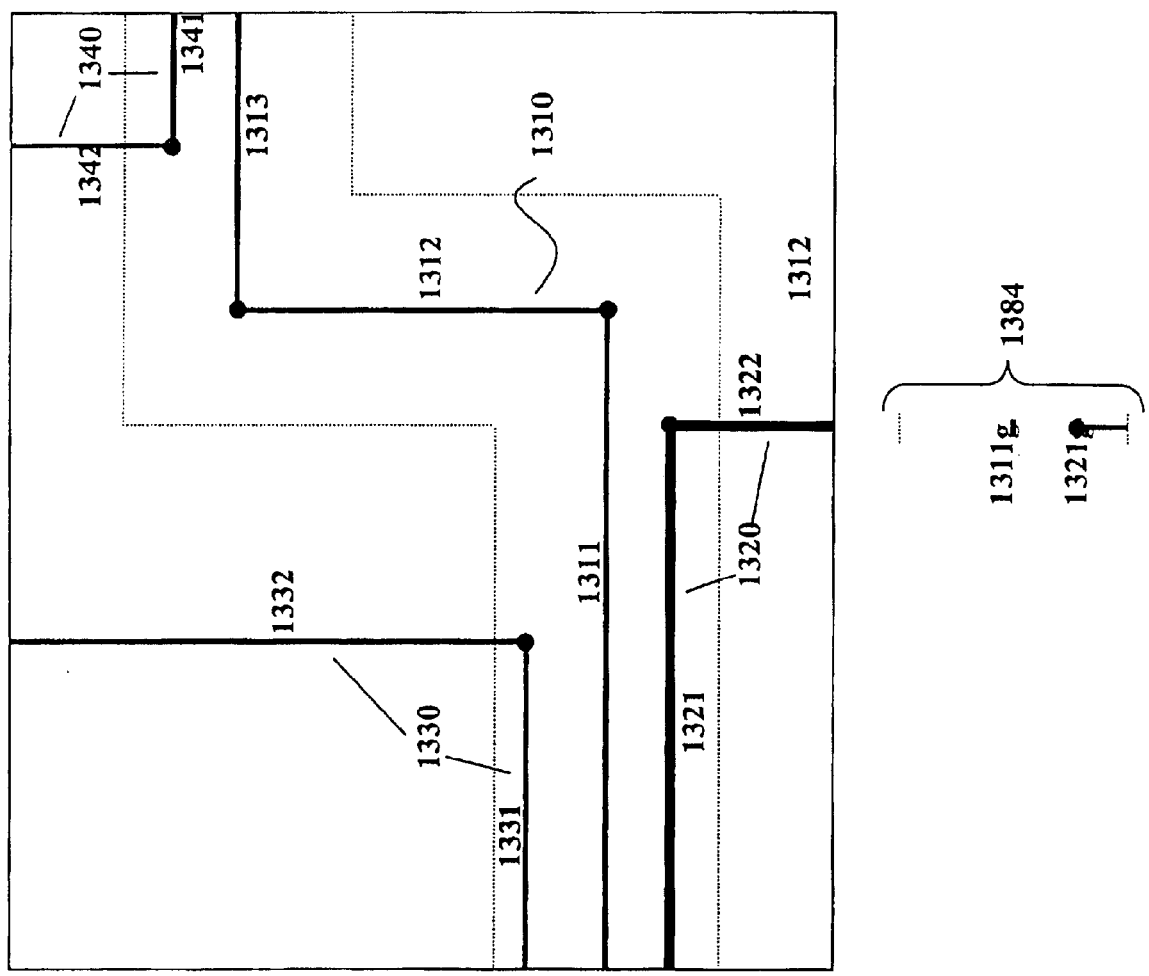
FIG. 13G illustrates the calculation of the capacitance for a fourth horizontal section of critical net 1310.

Next, FIG. 13F illustrates the interconnect wiring for an integrated circuit of FIG. 13A with a third two-dimensional section 1383 of net 1310 duplicated below the integrated circuit. In the third section 1383, horizontal wire 1311 of net 1310 is only affected by horizontal wire 1321. The capacitance effect of horizontal wire 1321 on interconnect wire 1311 per unit length is multiplied by the horizontal distance from vertical interconnect wire 1332 to vertical interconnect wire 1322. Next, a fourth two-dimensional section 1384 of net 1310 illustrated in FIG. 13G is taken into account by multiplying the capacitance effect of section 1384 by the width of vertical interconnect wire 1322.

Figure 13H:
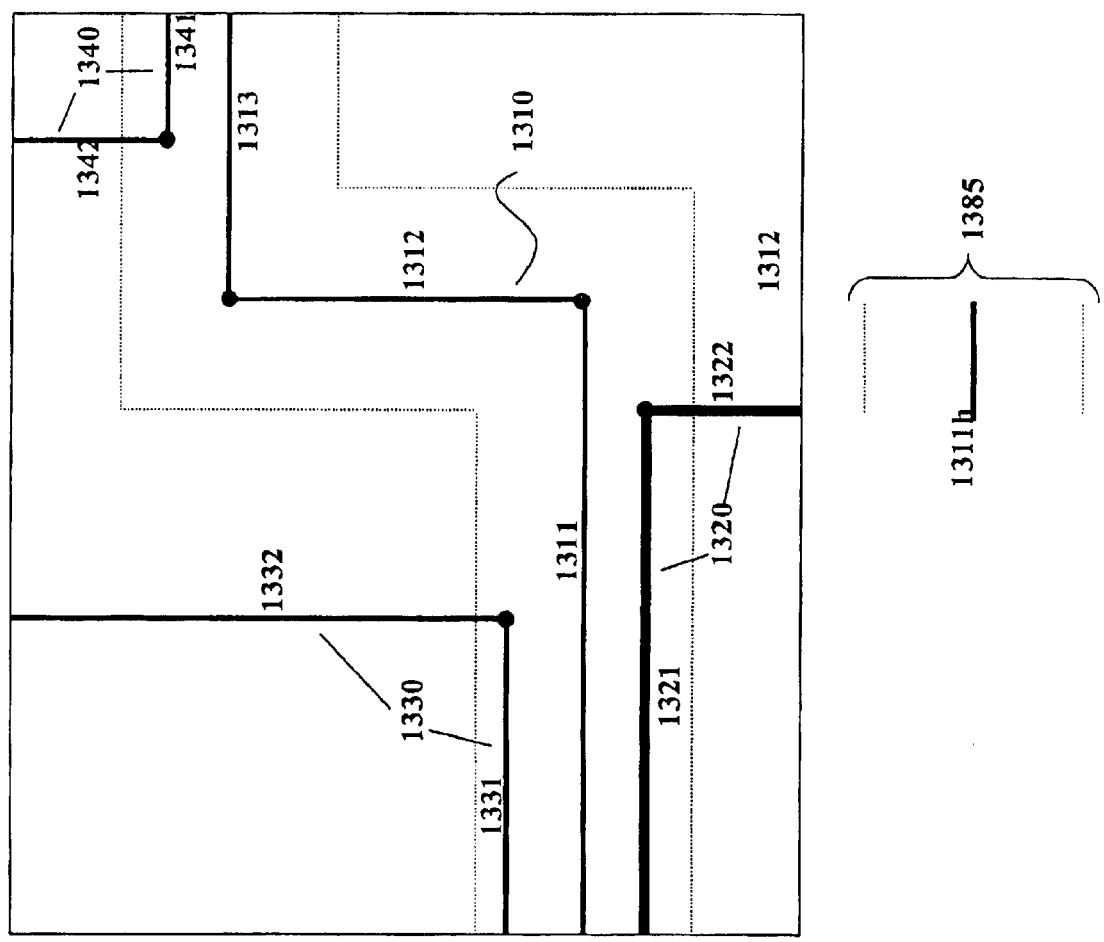
FIG. 13H illustrates the calculation of the capacitance for a fifth horizontal section of critical net 1310.

Finally, FIG. 13H illustrates a fifth section 1385 of net 1310 that consists of the final section of horizontal interconnect wire 1311. As illustrated in FIG. 13H, there are no other interconnect wires within the halo around section 1385, thus there is not significant capacitance effect for section 1385 of net 1310.

The fully modeled capacitance along interconnect wire 1311 of net 1310 is calculated by summing together the modeled capacitance of each of the individual sections 1381 to 1385 illustrated in FIGS. 13D to 13H, respectively. The capacitance of each individual section is calculated by multiplying the length of that section by the capacitance per unit length of that section profile. Thus the total capacitance for interconnect wire 1311 of net 1310 maybe calculated as follows:

$$\sum_{i=1381}^{1385} l_i \times C_i =$$

$$l_{1381} \times C_{1381} + l_{1382} \times C_{1382} + l_{1383} \times C_{1383} + l_{1384} \times C_{1384} + l_{1385} \times C_{1385}$$

Where $l_i$=the length of interconnect wiring section i; and $C_i$=the capacitance per unit length of interconnect wiring section i.

Determining the Capacitance of a Section

Figure 14A:
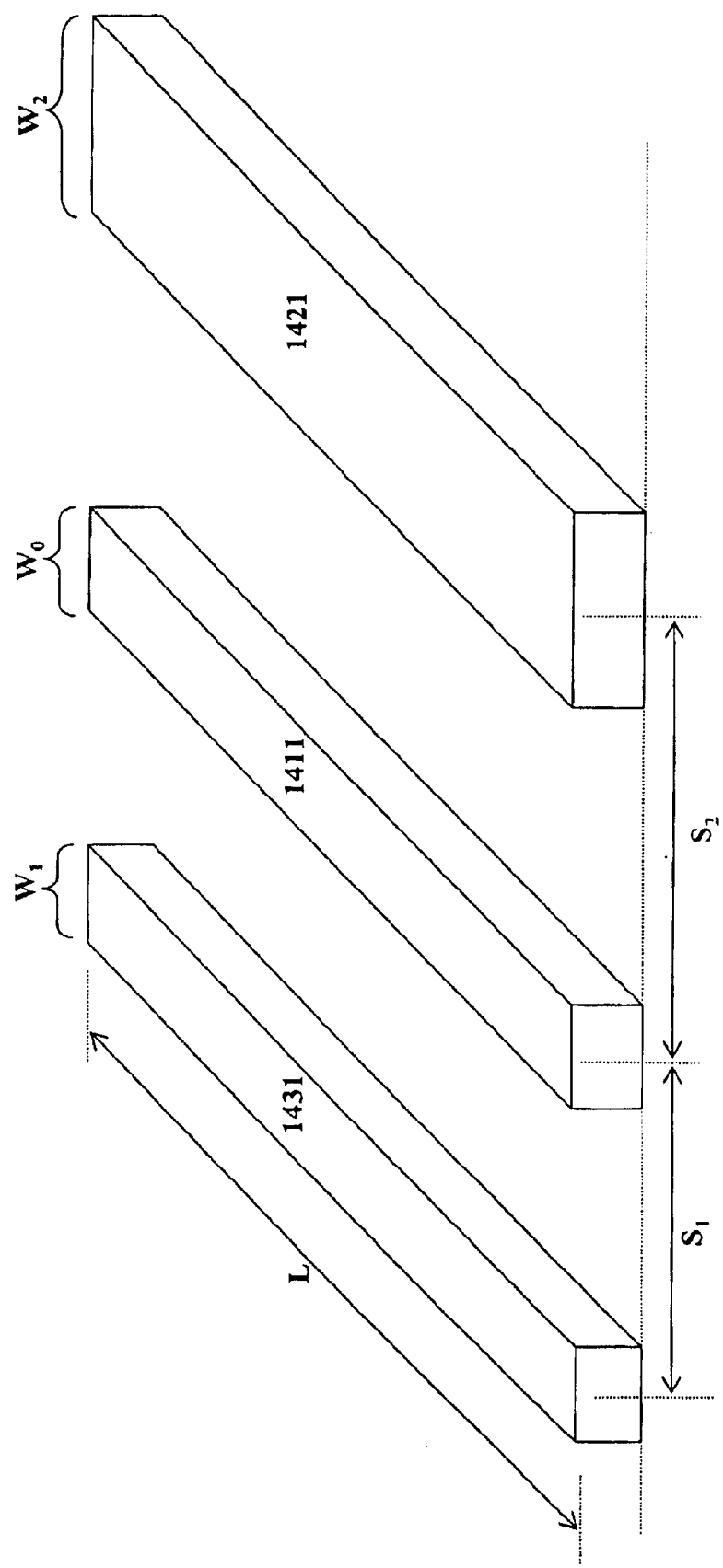
FIG. 14A illustrates a detailed three-dimensional view of interconnect wiring section 1381 of FIG. 13D.

Referring back to FIG. 13D, section 1381 consists of the aggressor net 1311d surrounded by victim nets 1331d and 1321d. FIG. 14A illustrates a detailed view of how the interconnect wires of section 1381 may appear. Capacitance is a physical attribute that is determined by the size, shape, and proximity of conductive materials. The capacitance problem of FIG. 14A can be defined by the length of the section L, the width of each wire section ($W_0$, $W_1$, and $W_2$), the distance between the victim wire 1431 and the aggressor wire 1411 ($S_1$), and the distance between the victim wires 1421 and the aggressor wire 1411 ($S_3$).

By ignoring the limited capacitive effects at the ends of the section, the problem can be solved in a two-dimensional realm to determine a two-dimensional capacitance value. Thus, the two-dimensional capacitance problem can be expressed in terms of the five variables $W_0$, $W_1$, $W_2$, $S_1$, and $S_2$. The two-dimensional capacitance value is then multiplied by the length of the section to determine the capacitance of the section.

Figure 14B:
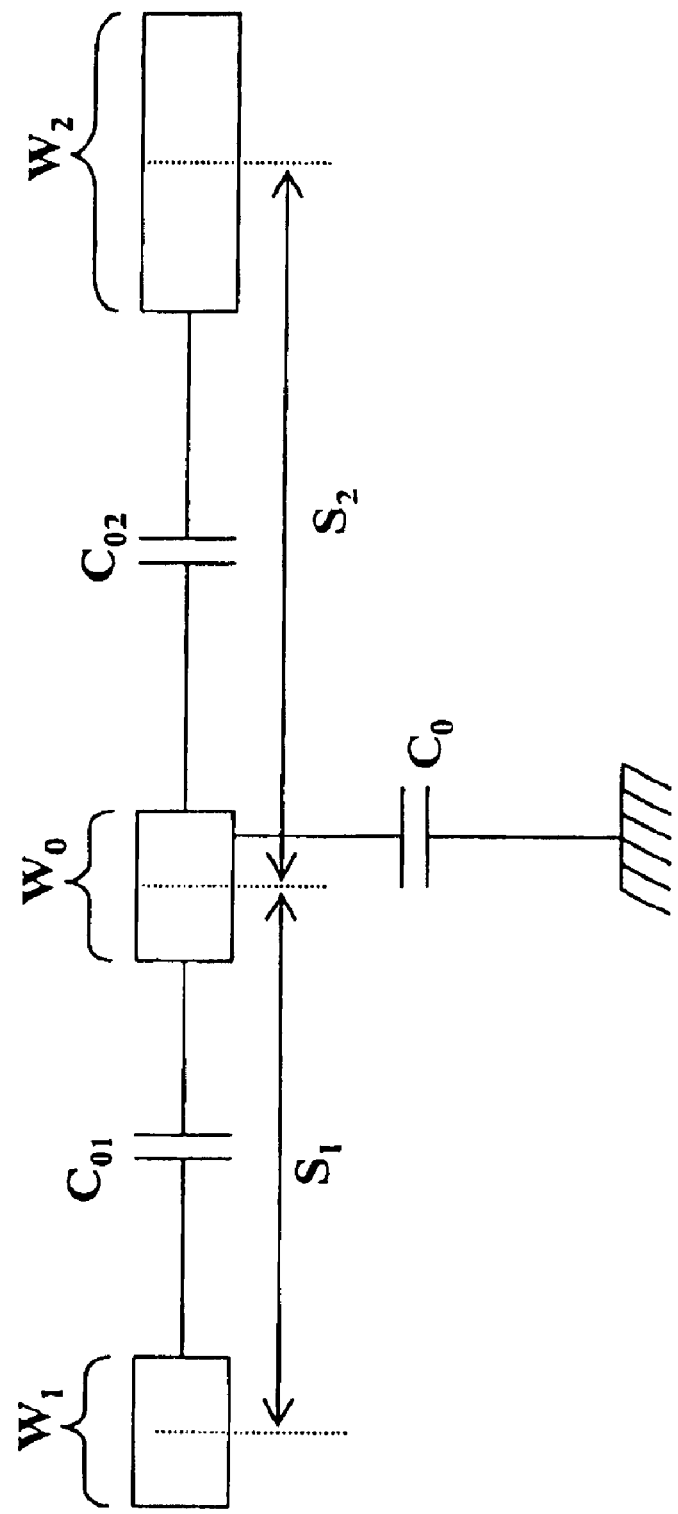
FIG. 14B illustrates a two-dimensional cross section view of interconnect wiring section of FIG. 14A.

FIG. 14B illustrates a two-dimensional cross section of the capacitance problem of FIG. 14A. A two-dimensional field solver can be used to solve the two-dimensional capacitance problem of FIG. 14B. The output of the capacitance extraction is the capacitance between the aggressor wire and the first victim wire $C_{O1}$, the capacitance between the aggressor wire and the first victim wire $C_{O2}$, and the capacitance between the aggressor wire and the ground plane $C_0$. Thus, the capacitance problem for sections having the two-dimensional profile of FIGS. 14A and 14B can be expressed in terms of five input variables ($W_0$, $W_1$, $W_2$, $S_1$, and $S_2$) and three output values ($C_{O1}$, $C_{O2}$, and $C_0$). The different output values are often added together and expressed as a single capacitance value C.

More Difficult Capacitance Extraction Examples

The capacitance extraction example set forth in the previous section was a very simplified capacitance extraction problem. Most real world capacitance problems are much more difficult.

Figure 15:
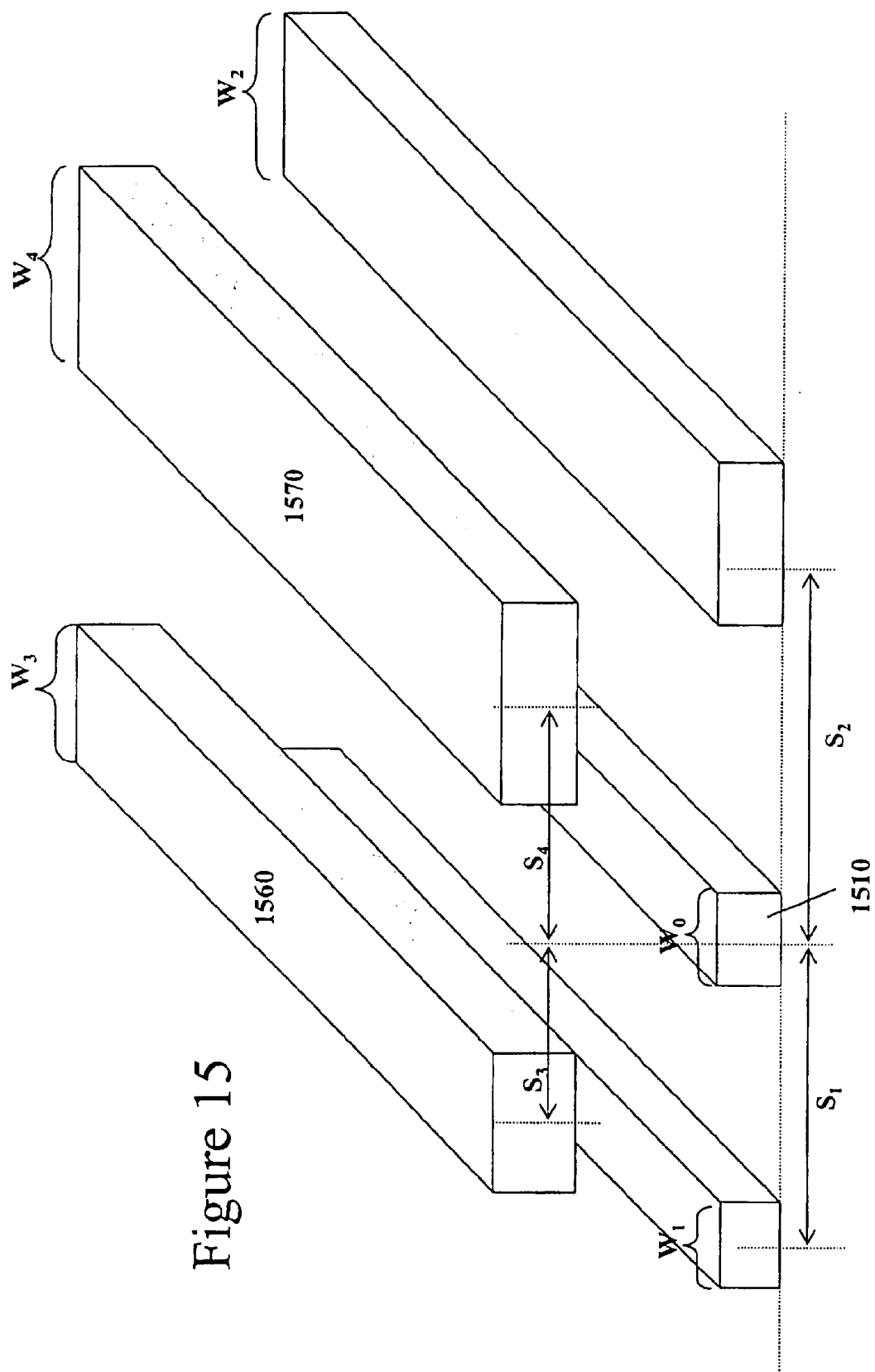
FIG. 15 illustrates a three-dimensional view of a section containing two layers interconnect wiring.

For example, FIG. 15 illustrates a more complex capacitance extraction problem. Specifically, the example of FIG. 15 contains two additional interconnect wires (1560, 1570) on a higher metal layer that should be taken into consideration.

The vertical distance between the different metal layers affects the capacitance calculation. However, the vertical distance between the different metal layers in a particular semiconductor process is a fixed constant value. Thus, in a model is built specifically for a particular semiconductor process and metal layer, the vertical distance may be ignored since it does not vary. Therefore, the capacitance problem for sections having the profile illustrated in FIG. 15 has nine input variables ($W_0$, $W_1$, $W_2$, $W_3$, $W_4$, $S_1$, $S_2$, $S_3$, and $S_4$) and five output values ($C_{O1}$, $C_{O2}$, $C_{O3}$, $C_{O4}$, and $C_0$).

Figure 16:
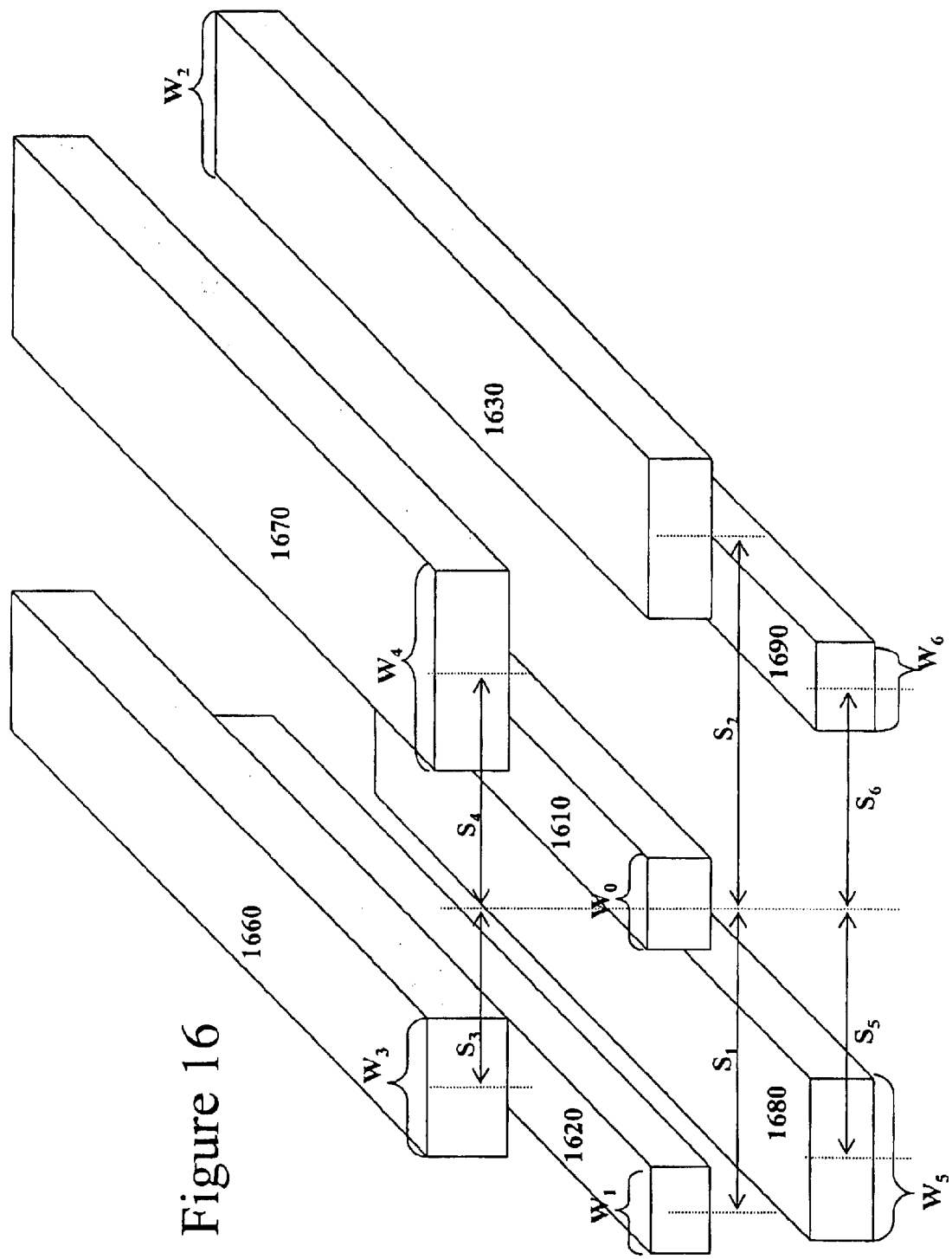
FIG. 16 illustrates a three-dimensional view of a section containing three layers interconnect wiring.

FIG. 16 illustrates yet an even more complex capacitance extraction problem. The capacitance extraction for the profile of FIG. 16 must take into account the capacitance effects from two interconnect wires on the same metal layer (1620, or 1630), two interconnect wires on a higher metal layer (1660, or 1670), and two interconnect wires on a lower metal layer (1680, or 1690). The capacitance problem for sections having the profile of FIG. 16 has thirteen input variables ($W_0$, $W_1$, $W_2$, $W_3$, $W_4$, $W_5$, $W_6$, $S_1$, $S_2$, $S_3$, $S_4$, $S_5$, and $S_6$) and seven output values ($C_{O1}$, $C_{O2}$, $C_{O3}$, $C_{O5}$, $C_{O6}$, and $C_0$).

Capacitance Determination by Interpolation

Many more different two-dimensional capacitance profiles exist and must be handled by a capacitance extraction system. As set forth previously, a vector of input variables can fully define the capacitance extraction problems for the different wiring profiles. Most prior art capacitance extraction systems handle the task of by having several large tables that contain known capacitance values for different two-dimensional profiles. A different capacitance value table exists for each different two-dimensional profile.

Figure 17:
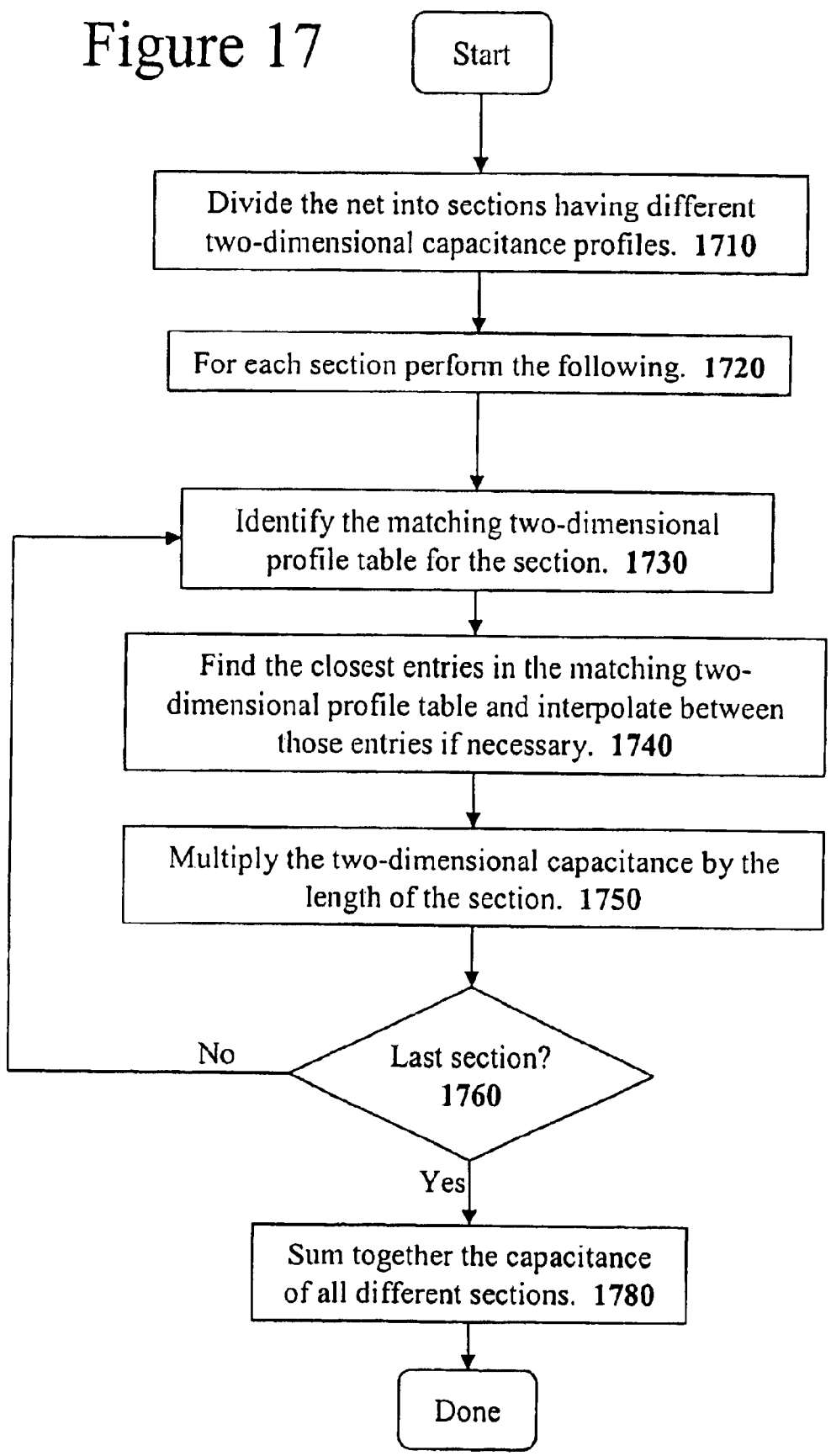
FIG. 17 illustrates a flow diagram describing a prior art method of determining capacitance using capacitance tables and interpolation.

FIG. 17 illustrates a flow diagram that describes how some prior art capacitance extraction systems operate to estimate the capacitance of a particular net using sets of capacitance profile tables. Initially, at step 1710, the system first divides the net into several different sections wherein each different section has a different two-dimensional capacitance profile. This step was previously described with reference to FIGS. 13D to 13H.

Next, at step 1720, the system begins an iterative process to determine the capacitance of each different section. The first step in the analysis of a particular section is to identify the capacitance table for the two-dimensional profile that matches the two-dimensional profile of the section being analyzed as set forth in step 1730. A simple pattern matching system is used to perform this step.

Next, at step 1740, the system locates the closest matching entries in the selected capacitance table. If an exact match is found, then the two-dimensional capacitance of that particular section is known. If no exact match is found, then the system interpolates between the closest entries in the table to determine a two-dimensional capacitance value. Many different systems may be used to perform the interpolation such as a linear interpolation, a least-squares fit, or a polynomial function.

Finally, at step 1750, the system multiplies the determined capacitance per unit length value for that section by the length of that section. The product is stored for future reference.

Is At step 1760, the system determines if all the different sections of the net have been analyzed. If more sections of interconnect wire need to be analyzed, the system returns to step 1730 to analyze the next interconnect wire section. Otherwise the system proceeds to step 1780. At step 1780, the system sums together the capacitance values computed for all the different sections of the net to determine an overall capacitance of the net.

The pre-computed table and interpolation system set forth in FIG. 17 requires extremely large tables to accurately determine capacitance values in semiconductor layouts for current semiconductor process technologies. Future semiconductor processes will be even more dense and thus will present even more difficult capacitance extraction problems.

Capacitance Extraction Using Machine Learning

As previously set forth, the system of the present invention uses large amounts of capacitance data generated by field-solvers and uses that capacitance data to build a model for predicting capacitance using machine learning. The machine-learning built model is then used to generate capacitance values for novel profiles.

Figure 18:
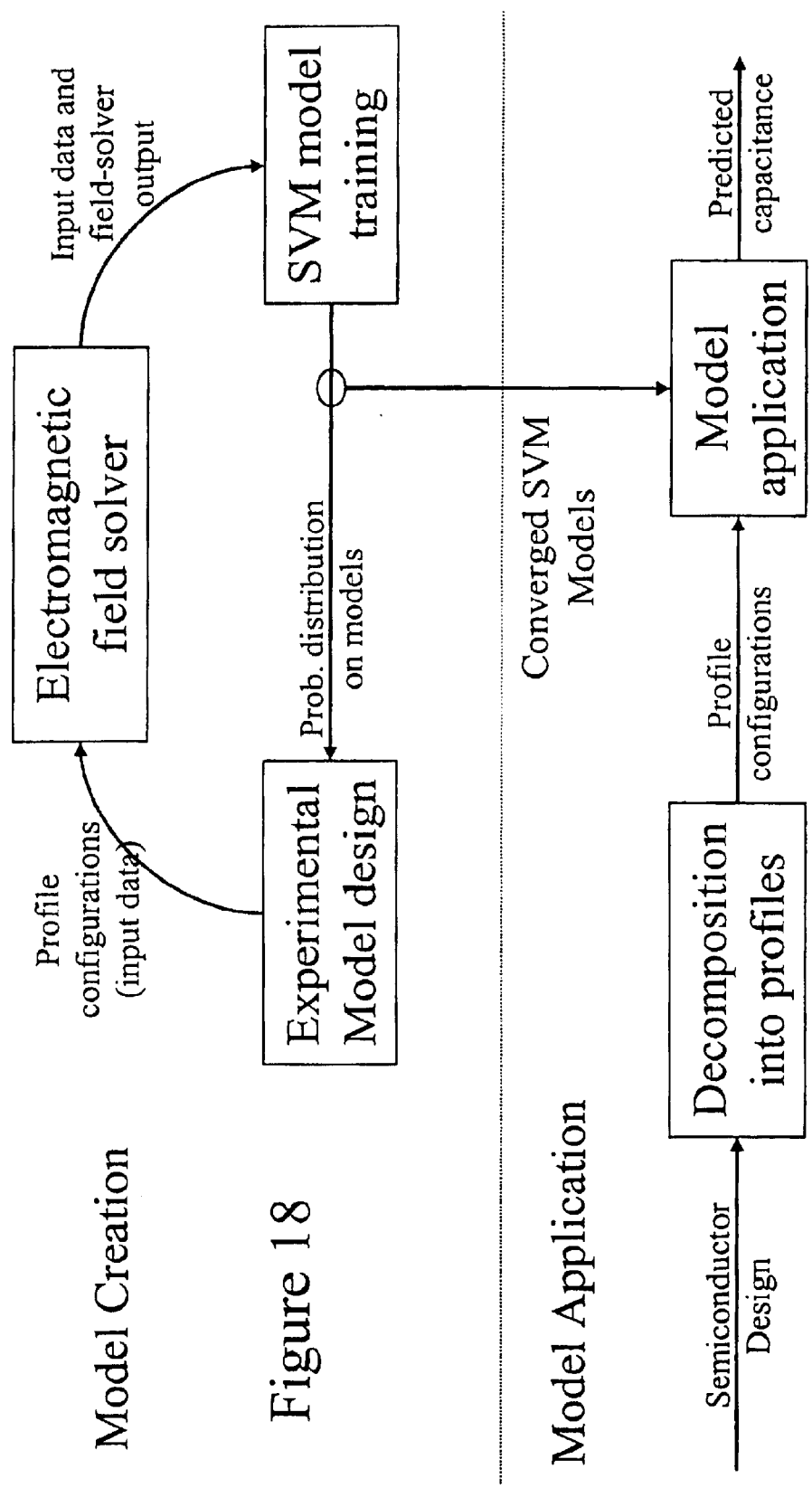
FIG. 18 illustrates a conceptual diagram describing how the present invention generates support vector machine models for capacitance estimation and applies those support vector machine models.

In one embodiment, the system uses a support vector machine. FIG. 18 provides a conceptual diagram that describes the system of the present invention with reference to an implementation that builds support vector machine models for capacitance extraction using machine learning. FIG. 18 will be described with reference to FIGS. 19 and 20 that describe the model creation and model application methods, respectively, in greater detail.

Extraction Model Creation

Figure 19:
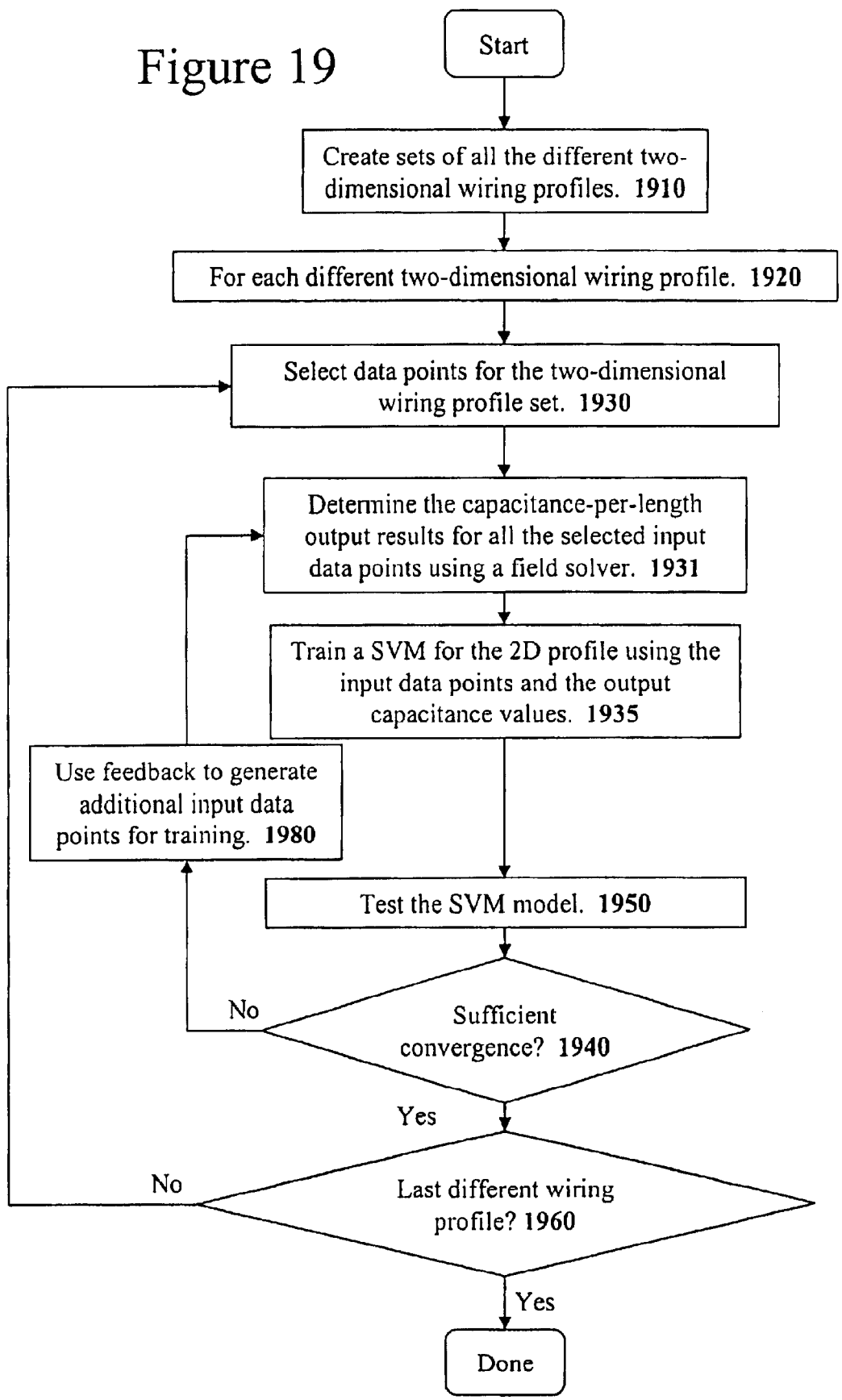
FIG. 19 illustrates a flow diagram describing one embodiment of generating support vector machine models for predicting the capacitance of two-dimensional profiles.

The top half of FIG. 18 describes the creation of a support vector machine model for capacitance determination. FIG. 19 provides a flow diagram for the support vector machine model creation using machine learning. Referring to FIG. 18, the system begins with an experimental model design to select a set of interconnect wire profile configurations that will be used as input data for a field solver. The experimental design techniques are also used to generate the most informative data points. Referring to FIG. 19, the first step 1910 is to create a set of all the different two-dimensional wiring profiles. Next, at step 1920, the system begins to systematically build a model for each different wiring profile.

At step 1930, a loop begins for creating a model. Specifically, at step 1930, an iterative process begins to create a support vector machine models for each different two-dimensional wiring profile. At step 1930, an initial set of input data points are selected for the current two-dimensional wiring profile. Referring back to FIG. 18, the profile configurations (the input data) are provided to field solver. The field-solver is used to generate a set of known output capacitance values that will be used as training data.

Referring back to FIG. 19, at step 1931, the field-solver is used to determine capacitance values for the selected input data points. Then, at step 1935, the input data points and associated output capacitance values are used to train a support vector machine model to predict capacitance values for that two-dimensional wiring profile. At step 1940, the system determines if sufficient convergence has been reached for the model. If the model has not reached sufficient convergence, then feedback from the testing is used to select additional input training data points at step 1980. The system then proceeds back step 1931 to further refine the support vector machine model using the newly selected input data training points.

If sufficient convergence has been achieved as tested at step 1940, the model is ready to be used for capacitance extraction and the system proceeds to step 1960. At step 1960, a determination is made to see if all the needed extraction models have been created. If all the needed extraction models have not yet been created the method returns back to step 1930 to create an extraction model for the next two-dimensional wiring profile. After creating the extraction models for the different two-dimensional wiring profiles, the models may be used with an extraction system.

Extraction Model Application

Returning to FIG. 18, once the support vector machine models have been sufficiently trained, the support vector machine models may be used for extracting capacitance. The lower half of FIG. 18 conceptually illustrates how the support vector machine models are used in extraction.

Figure 20:
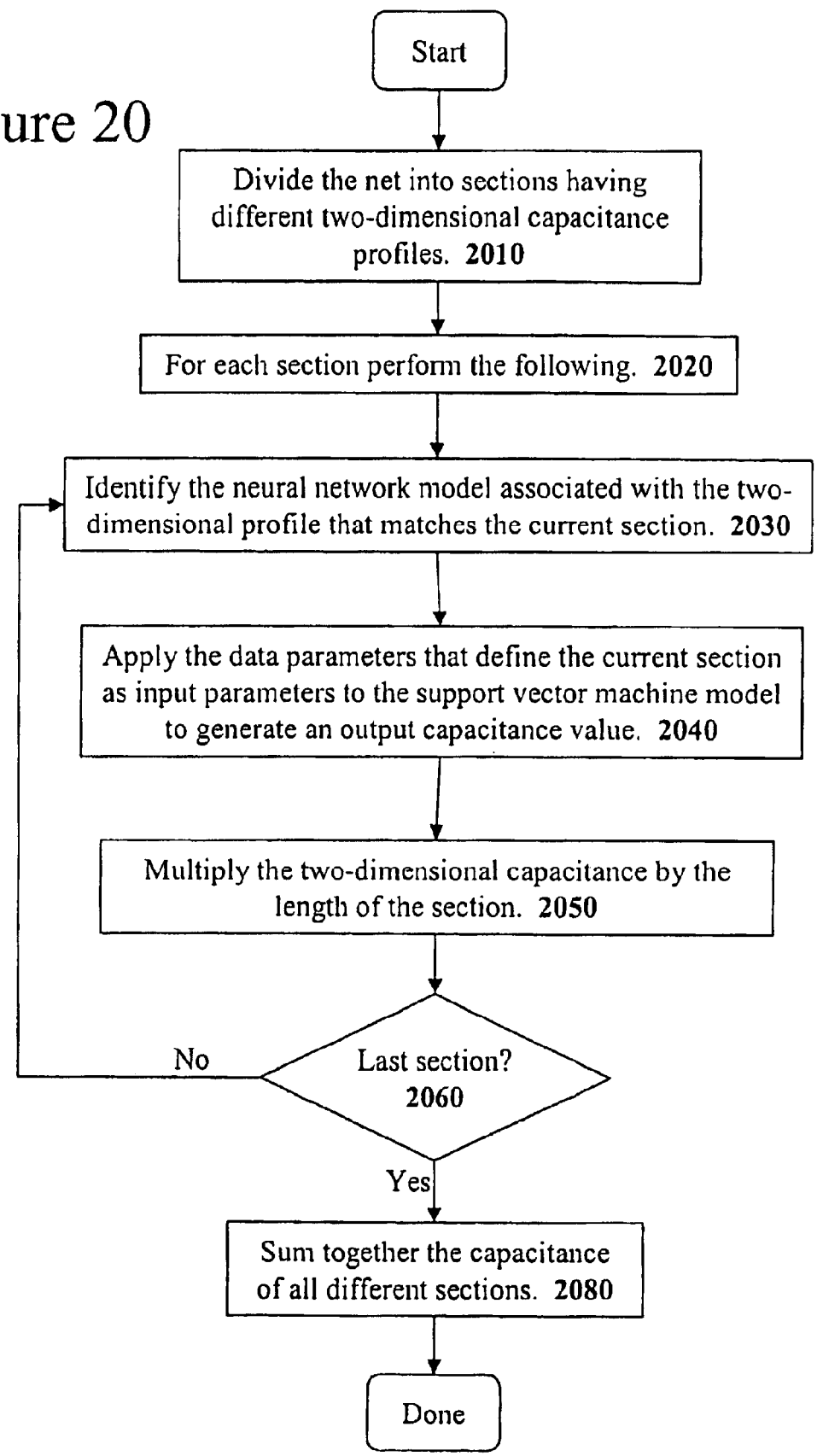
FIG. 20 illustrates a flow diagram describing how support vector machine models may be used to extract the capacitance of a net in an integrated circuit layout.

FIG. 20 illustrates a flow diagram that describes how a support vector machine model is used to extract the capacitance of a net. As with prior systems, the net is first divided into different interconnect wiring sections having different two-dimensional capacitance profiles. Then, at step 2020, the iterative process of analyzing each different section begins.

At the first step in the iterative process, step 2030, the system identifies the support vector machine model associated with the two-dimensional profile that matches the current wiring section. Then at step 2040, the data parameters that define the current two-dimensional profile are provided to the selected support vector machine model to obtain a predicted capacitance per unit length value from the support vector machine model. Then, at step 2050, the extraction system multiplies the predicted two-dimensional capacitance per unit length value by the length of the current interconnect wiring section to determine the capacitance of the interconnect wiring section. This calculated capacitance is stored for later use.

At step 2060, the system determines if this is the last interconnect wiring section of the net. If this is not the last interconnect wiring section, then the system returns to step 2030 to analyze the next interconnect wiring section.

Referring again to step 2060, if this is the final interconnect wiring section then the system proceeds to step 2080. At step 2080, the system sums together all the capacitance values for the different interconnect wiring sections to determine the overall capacitance of the net.

Resistance Extraction

It is also desirable to extract the resistance of interconnect lines. Resistance on interconnect lines can cause delays and lower output voltages. By extracting interconnect line resistance values, the circuits may be simulated to ensure that the circuits perform as desired.

Calculating the resistance of an interconnect line is generally a less complicated task than calculating the capacitance of an interconnect line. For example, the calculation of the resistance for a single straight interconnect line is simply the resistance per unit length multiplied by the length of the interconnect line. The resistance per unit length can generally be calculated when the cross sectional area of interconnect line and the material composition of the interconnect line are known.

The cross-section area for a typical rectangular interconnect line is simply the width of the interconnect line multiplied by the height of the interconnect line (the height of the metal layer). Since the height of the metal layer and the material composition of the interconnect line are fixed for a particular semiconductor manufacturing process, the only parameters required when modeling a straight interconnect line are the width of the interconnect line and the length of the interconnect line. For such a simple model, a support vector machine is generally not necessary and not used.

However, most interconnect wires are not simply straight lines. The interconnect wires will turn corners, switch layers, and fork out to more than one termination point. All of these complex factors can effect the resistance of the interconnect line. However, the machine-learning techniques of the present invention can be used account for such complex factors after training upon a sufficient number of training cases.

To perform resistance extraction using the machine-learning techniques of the present invention, the same overall procedure is used as described in the previous sections. Specifically, the resistance extraction problem is first decomposed into smaller simpler resistance extraction sub problems that can be used to represent any interconnect wire. Each smaller resistance extraction sub problem is then analyzed to identify a set of parameters that fully define the smaller resistance extraction sub problem. Then, resistance extraction support vector machine models are built for all of the smaller resistance extraction sub problems by creating training data sets and training machine learning models. However, no support vector machine model is typically needed for the simple straight line interconnect wire with a rectangular cross section.

Resistance Extraction Sub Problems To apply the resistance extraction models, the resistance extraction software would first decompose a given interconnect wire into the various smaller resistance extraction sub problems. Then, for each smaller resistance extraction sub problem, the parameters that define that smaller resistance extraction problem are supplied to a model trained for such a resistance extraction sub problem. For the simple straight line interconnect wire with a rectangular cross section, no machine learning model is needed.

A simple rectangle for straight line interconnect line runs and FIGS. 21, 22, 23, and 24 describe different shapes that an interconnect wire may be decomposed into. As previously set forth, the-straight line is a trivial case. The resistance of a straight line interconnect line run can be calculated by multiplying the resistance per unit length (as determined from the cross section and material composition) by the length of the straight line run.

Figure 21:
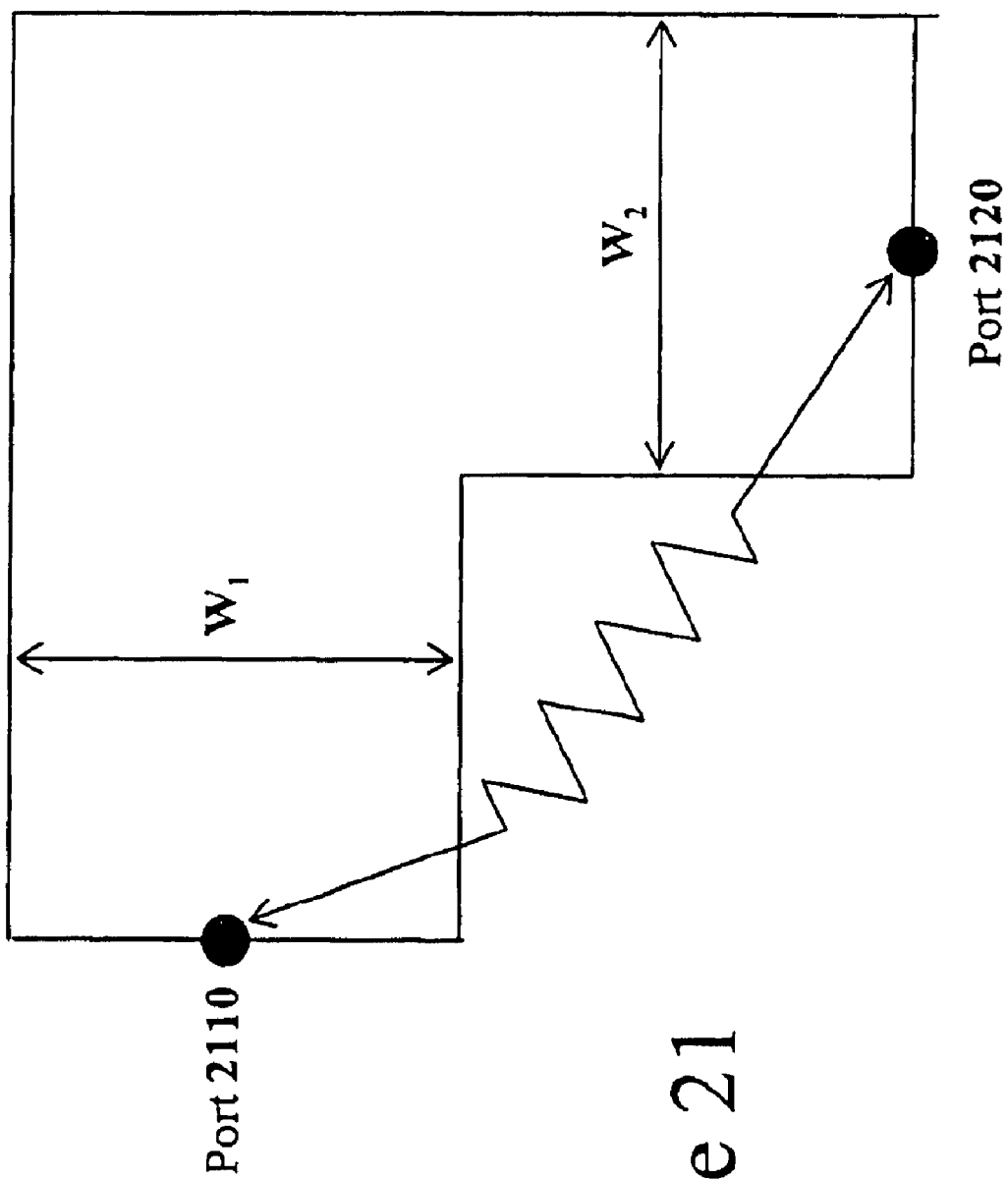
FIG. 21 illustrates a two-port corner shape for a resistance extraction sub problem.

FIG. 21 illustrates a simple interconnect line corner. The sub extraction problem of FIG. 21 can be used to determine the resistance between port 2110 and port 2120 for corners. The input parameters are interconnect line widths ($W_1$ and $W_2$). The lengths of the two legs of the corner are short such that most of the interconnect line is handled with a simple straight-forward model. The corner outputs a single resistance value.

Figure 22:
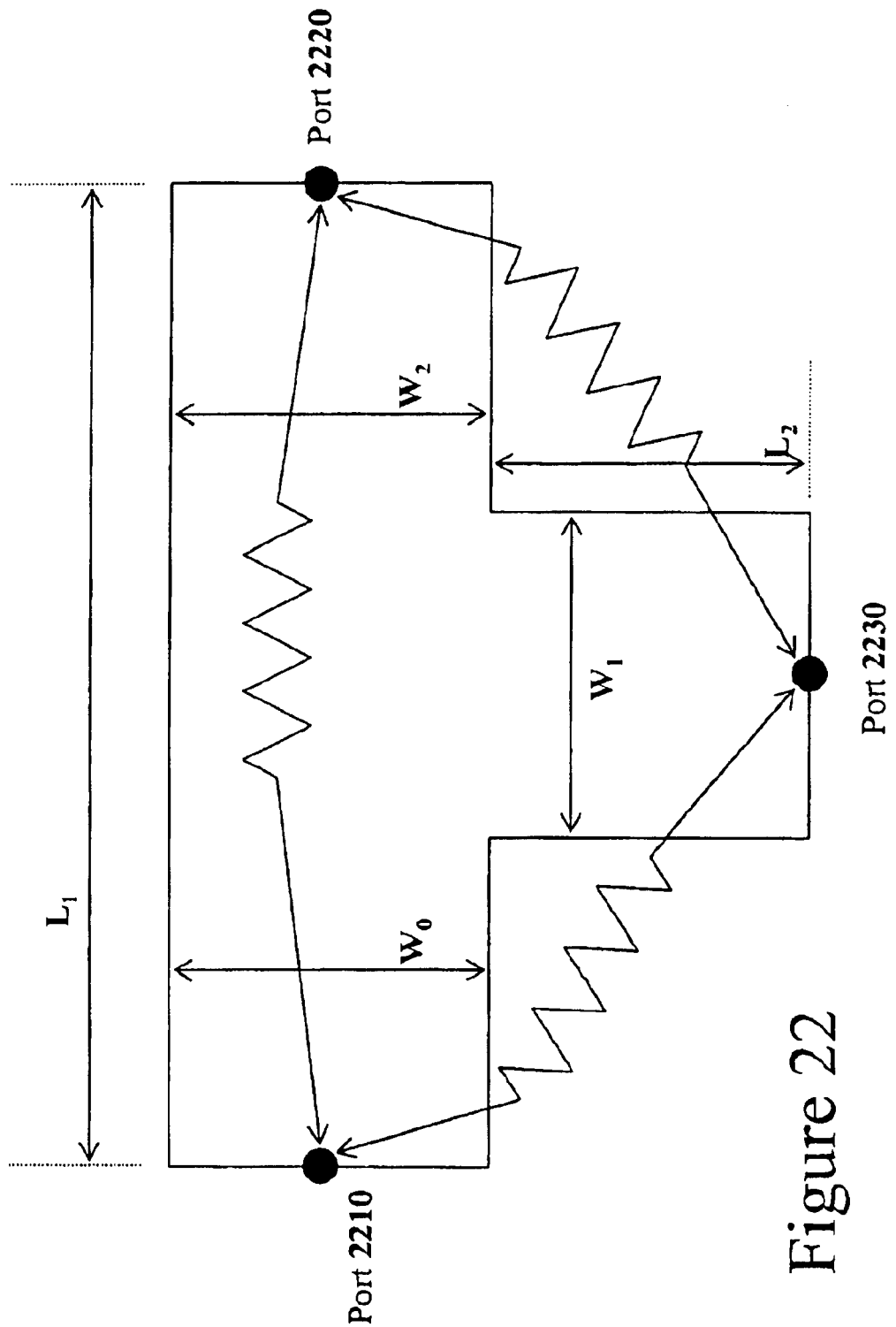
FIG. 22 illustrates a three-port "T" shape for a resistance extraction sub problem.

FIG. 22 illustrates a three-port "T" shape that may be present in interconnect lines. The sub extraction problem of FIG. 22 can be used to determine the resistance between any of the three ports 2210, 2220, and 2230 for such three port "T" shapes. The input parameters are interconnect line widths $W_0$, $W_1$, and $W_2$ near ports 2210, 2220, and 2230, respectively. The three-port "T" shape of FIG. 22 outputs a three resistance values.

Figure 23:
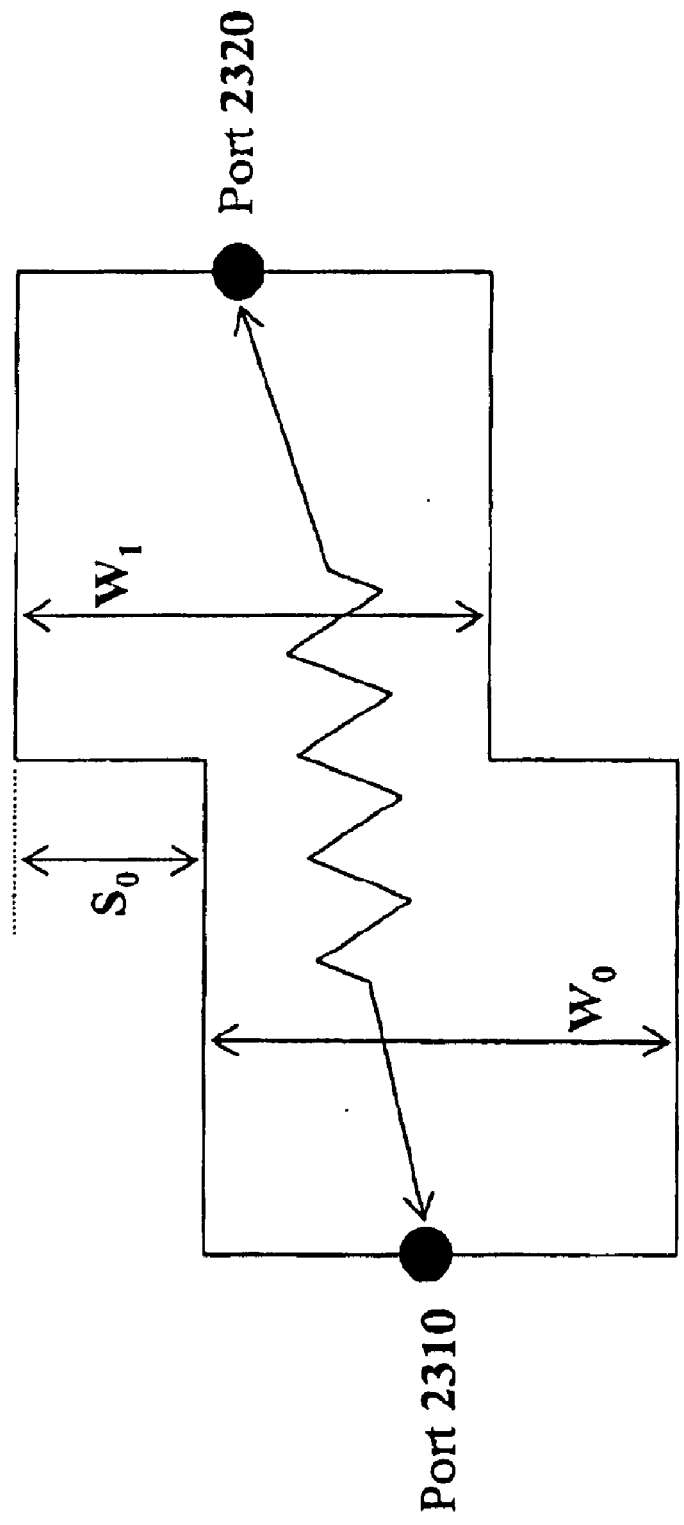
FIG. 23 illustrates the two-port jog shape for a resistance extraction sub problem.

FIG. 23 illustrates a small step shape that an interconnect line may include. The step shape of FIG. 23 may occur when an interconnect line takes a small jog to avoid an obstacle. The extraction problem of FIG. 21 can be used to determine the resistance between port 2310 and port 2320 for such small jogs. The input parameters are interconnect line widths $W_0$ and $W_1$ near ports 2310 and 2320, respectively and the step size $S_0$. The lengths of the two legs of the jog are short such that most of the interconnect line is handled with a simple straight-forward rectangular model. The jog sub extraction problem outputs a single resistance value.

Figure 24:
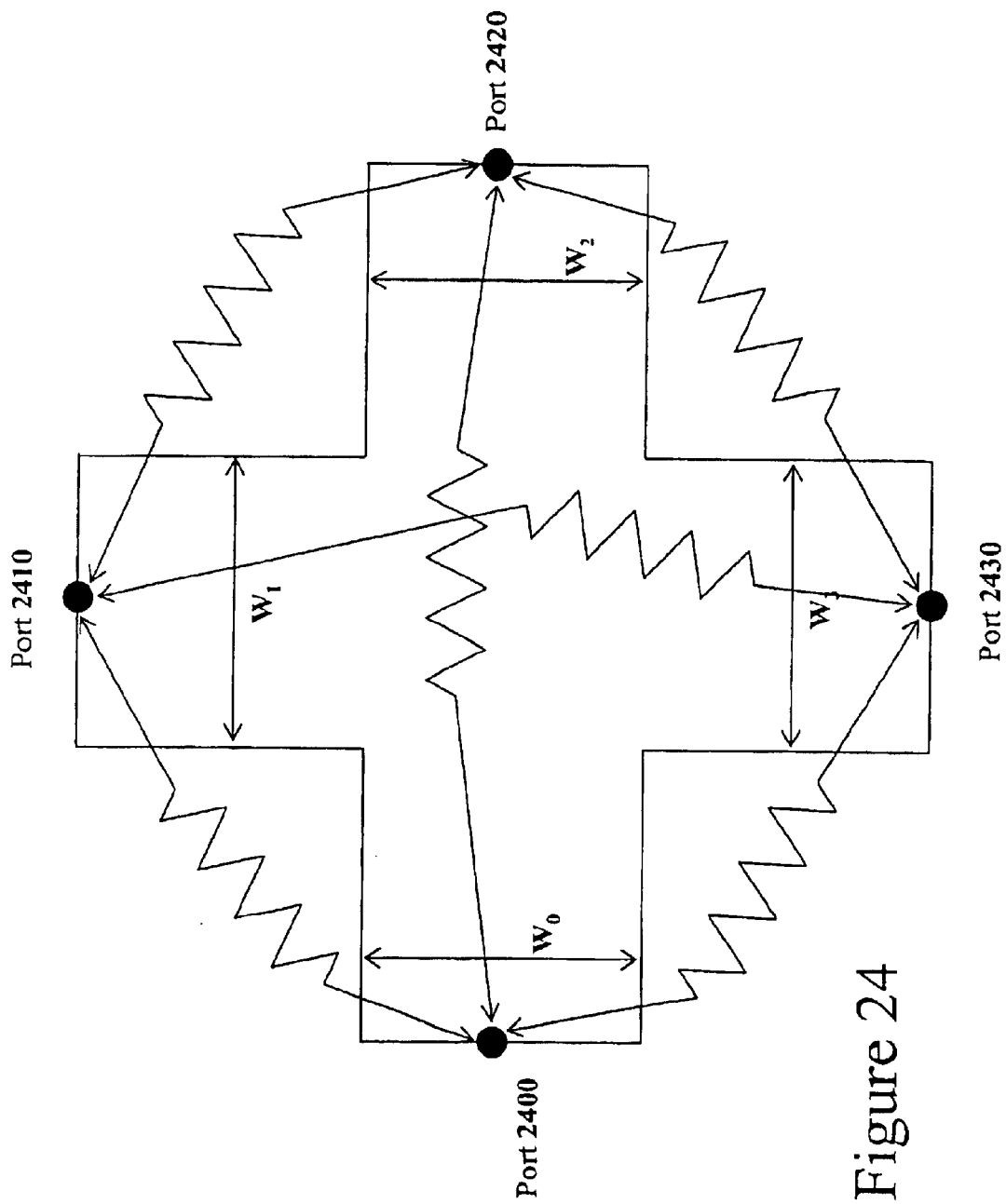
FIG. 24 and illustrates a four-port cross shape for a small resistance extraction problem.

FIG. 24 illustrates a complex four-port shape that rarely occurs. The four-port extraction problem of FIG. 24 can be used to determine the six different resistance values between the various different ports 2400, 2410, 2420, and 2430 as illustrated in FIG. 24. The input parameters for the four-port shape extraction problem of FIG. 24 are the four interconnect line widths $W_0$, $W_1$, $W_2$ and $W_3$. The four-port shape extraction support vector machine model outputs six different resistance values for the six different resistances illustrated in FIG. 24.

Decomposing into Resistance Extraction Sub Problems

Figure 25A:
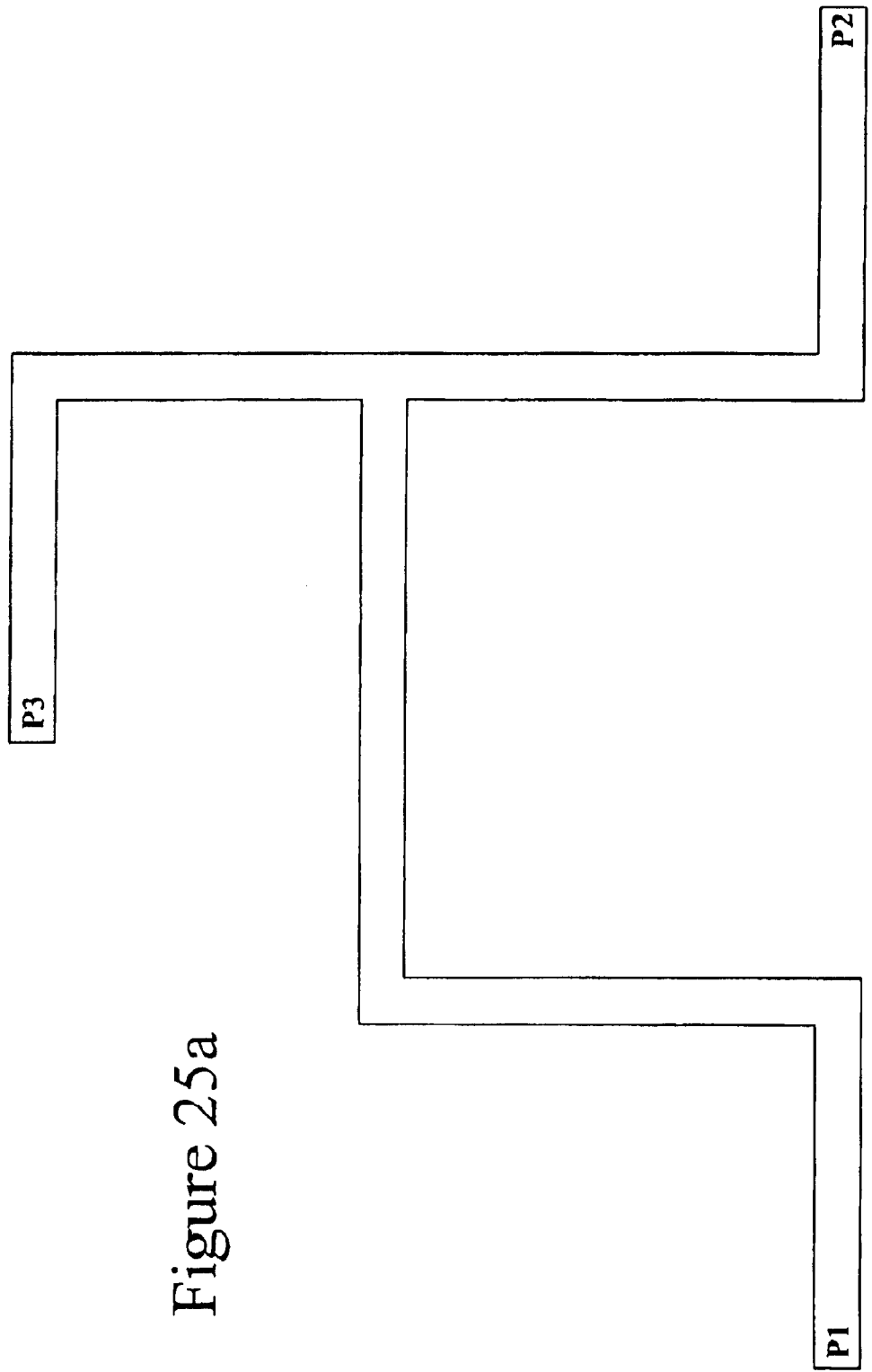
FIG. 25A illustrates a net with three end points P1, P2, and P3.

An example of how a net is decomposed into resistance extraction sub problems will be presented with reference to FIGS. 25A, 25B, 25C, and 25D. FIG. 25A illustrates a net with three end points P1, P2, and P3. The resistance can be calculated from any endpoint to any other endpoint.

Figure 25B:
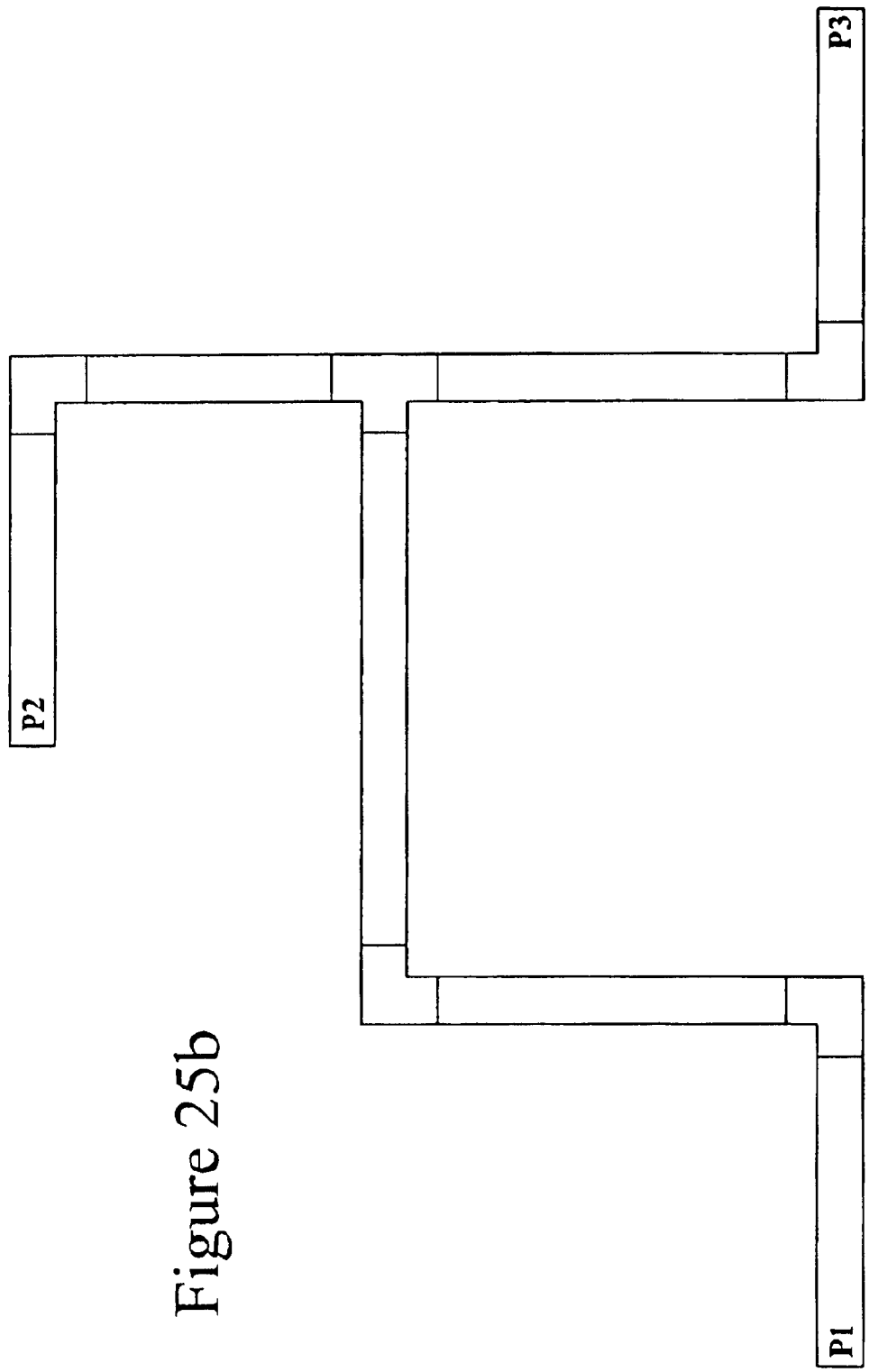
FIG. 25B illustrates the net of FIG. 25A after it has been divided into simple rectangles and the extraction sub problems of FIGS. 21 to 24.
Figure 25C:
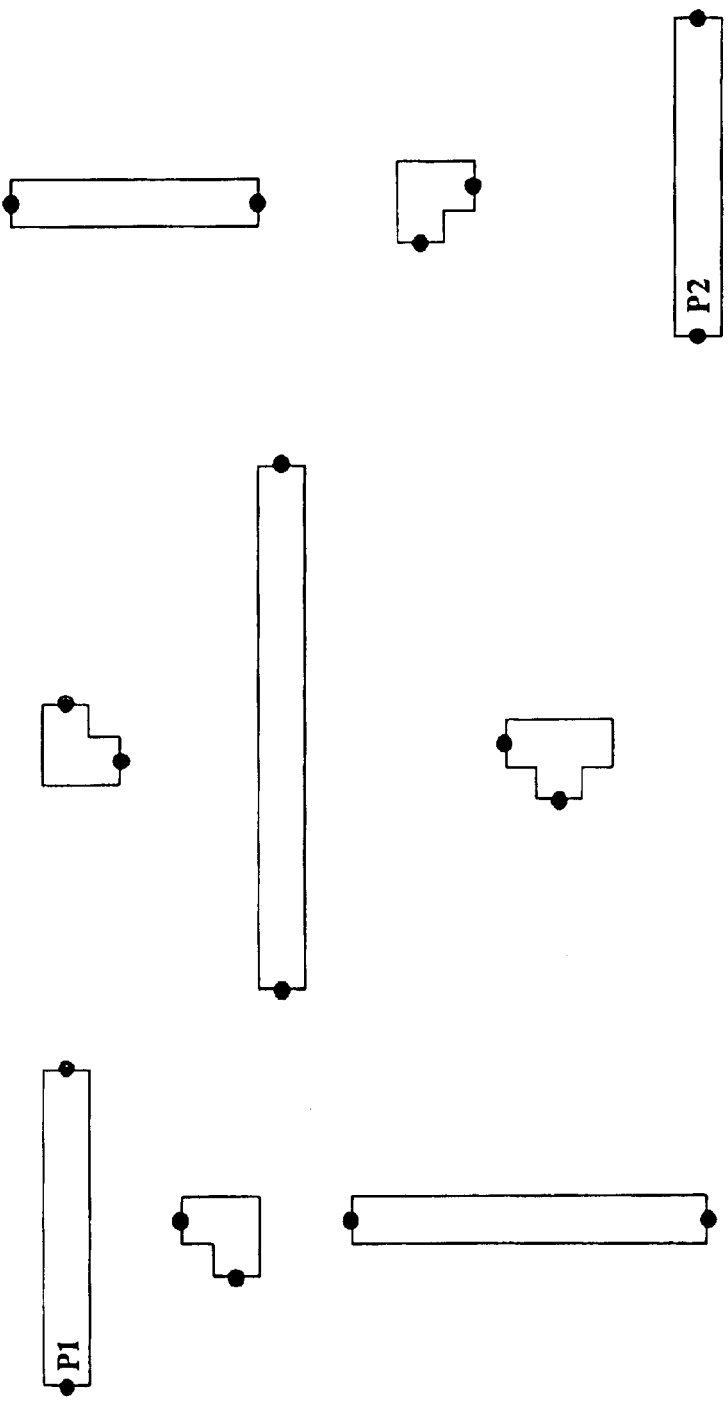
FIG. 25C illustrates the full list of sub extraction problems between endpoint P1 and endpoint P2 in the net of FIG. 25A.

To calculate the resistance from endpoint P1 to endpoint P2, the net is first decomposed into resistance extraction sub problems. FIG. 25B illustrates the net of FIG. 25A after it has been divided into simple rectangles and the extraction sub problems of FIGS. 21 to 24. Next, all the extraction sub problems between endpoint P1 and endpoint P2 are determined. The full list of sub extraction problems between endpoint P1 and endpoint P2 are illustrated in FIG. 25C. Thus by analyzing the five simple rectangles and four machine learning sub problems of FIG. 25C and adding the resistances together, the resistance between endpoint P1 and endpoint P2 may be determined.

Figure 25D:
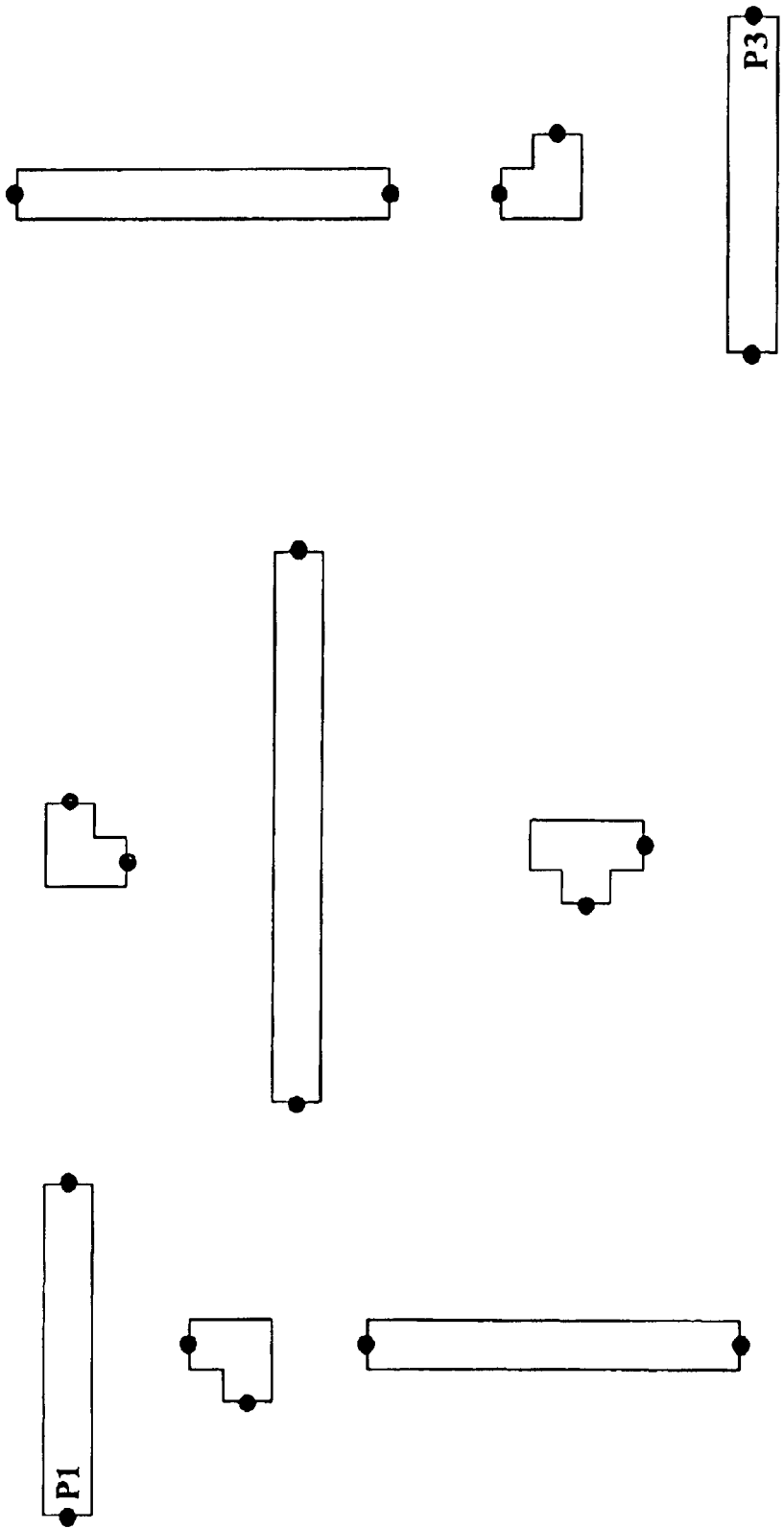
FIG. 25D illustrates the full list of sub extraction problems between endpoint P1 and endpoint P2 in the net of FIG. 25A.

The resistance from endpoint P1 to endpoint P3 is calculated in the same manner. The net is first decomposed into resistance extraction sub problems as illustrated by FIG. 25B. Next, all the extraction sub problems between endpoint P1 and endpoint P3 are determined. The full list of sub extraction problems between endpoint P1 and endpoint P3 are illustrated in FIG. 25D. Thus, the resistance between endpoint P1 and endpoint P2 may be determined by adding to together the resistances of the five simple rectangles and four machine learning sub problems of FIG. 25D.

The foregoing has described methods arrangement for extracting capacitance in integrated circuit designs using machine learning capacitance models. It is contemplated that changes and modifications may be made by one of ordinary skill in the art, to the materials and arrangements of elements of the present invention without departing from the scope of the invention.

We claim:

1. A method of constructing a model for estimating electrical characteristics for an extraction sub problem, said method comprising:

identifying a set of physical parameters of a set of physical measurements that define said extraction sub problem;

selecting a set of training cases for said specific extraction sub problem, each of said training cases including an associated set of said physical measurements;

solving said specific extraction sub problem for each of said training cases using said associated set of physical measurements as an input to an accurate physics based model to generate an associated output; and training a support vector machine using said associated set of physical measurements and associated output as training data.

2. The method of constructing a model for estimating electrical characteristics as claimed in claim 1 wherein said electrical characteristic comprises capacitance.

3. The method of constructing a model for estimating electrical characteristics as claimed in claim 1 wherein said electrical characteristic comprises resistance.

4. The method of constructing a model for estimating electrical characteristics as claimed in claim 1 wherein said extraction sub problem comprises a section of interconnect wire and nearby interconnect wiring within a define halo.

5. The method of constructing a model for estimating electrical characteristics as claimed in claim 1 wherein said extraction sub problem comprises a section of interconnect wiring.

6. The method of constructing a model for estimating electrical characteristics as claimed in claim 1 wherein one of said physical parameters comprises a spacing between a pair of interconnect lines.

7. The method of constructing a model for estimating electrical characteristics as claimed in claim 1 wherein one of said physical parameters comprises a wire width.

8. The method of constructing a model for estimating electrical characteristics as claimed in claim 1 wherein one of said physical parameters comprises a wire length.

9. The method of constructing a model for estimating electrical characteristics as claimed in claim 1 wherein selecting a set of training cases comprises randomly generating input parameters with a gamma probability distribution.

10. The method of constructing a model for estimating electrical characteristics as claimed in claim 1 wherein selecting a set of training cases comprises selecting a set of frequently occurring profile cases.

11. A computer readable medium containing a set of computer instructions for constructing a model for estimating electrical characteristics for an extraction sub problem defined by a set of physical parameters of a set of physical measurements, said computer instructions performing the steps of:

selecting a set of training cases for said specific extraction sub problem, each of said training cases including an associated set of said physical measurements;

solving said specific extraction sub problem for each of said training cases using said associated set of physical measurements as an input to an accurate physics based model to generate an associated output; and training a support vector machine using said associated set of physical measurements and associated output as training data.

12. The computer readable medium as claimed in claim 11 wherein said electrical characteristic comprises capacitance.

13. The computer readable medium as claimed in claim 11 wherein said electrical characteristic comprises resistance.

14. The computer readable medium as claimed in claim 11 wherein said extraction sub problem comprises a section of interconnect wire and nearby interconnect wiring within a define halo.

15. The computer readable medium as claimed in claim 11 wherein said extraction sub problem comprises a section of interconnect wiring.

16. The computer readable medium as claimed in claim 11 wherein one of said physical parameters comprises a spacing between a pair of interconnect lines.

17. The computer readable medium as claimed in claim 11 wherein one of said physical parameters comprises a wire width.

18. The computer readable medium as claimed in claim 11 wherein one of said physical parameters comprises a wire length.

19. The computer readable medium as claimed in claim 11 wherein selecting a set of training cases comprises randomly generating input parameters with a gamma probability distribution.

20. The method of constructing a model for estimating electrical characteristics as claimed in claim 1 wherein selecting a set of training cases comprises selecting a set of frequently occurring profile cases.

* * * * *